United States Patent [19]

Oda et al.

[11] Patent Number: 5,348,568
[45] Date of Patent: Sep. 20, 1994

[54] FILTERING METHOD OF FLUE GAS OF A BOILER AND A FILTER APPARATUS FOR HOT GAS

[75] Inventors: Noriyuki Oda, Tokyo; Hiroshi Maeno; Katsumi Higashi, both of Kawasaki; Akira Toriyama; Hiromi Shimoda, both of Tokyo, all of Japan

[73] Assignee: Asahi Glass Company Ltd., Tokyo, Japan

[21] Appl. No.: 13,381

[22] Filed: Feb. 4, 1993

[30] Foreign Application Priority Data

Feb. 5, 1992 [JP] Japan .................. 4-054415
Jun. 3, 1992 [JP] Japan .................. 4-168415

[51] Int. Cl.$^5$ .................. B01D 29/31; B01D 29/66
[52] U.S. Cl. .................. 95/14; 95/20; 95/279; 55/210; 55/283; 55/302; 55/523
[58] Field of Search .................. 55/18, 20, 21, 96, 210, 55/283, 302, 523

[56] References Cited

U.S. PATENT DOCUMENTS

| | | | |
|---|---|---|---|
| 3,073,097 | 1/1963 | Hallett et al. | 55/283 |
| 3,735,566 | 5/1973 | Laliwala | 55/283 X |
| 3,948,623 | 4/1976 | Ostby et al. | 55/96 |
| 4,299,597 | 11/1981 | Oetiker et al. | 55/96 |
| 4,319,897 | 3/1982 | Labadie | 55/302 |
| 4,331,454 | 5/1982 | Sweeney | 55/21 X |
| 4,436,535 | 3/1984 | Erdmannsdörfer et al. | 55/96 |
| 4,500,326 | 2/1985 | Sunter | 55/283 X |
| 4,507,130 | 3/1985 | Roth | 55/96 |
| 4,637,473 | 1/1987 | Gillis et al. | 55/302 X |
| 4,786,293 | 11/1988 | Labadie | 55/283 X |
| 4,812,149 | 3/1989 | Griffin et al. | 55/96 X |
| 4,865,627 | 9/1989 | Dewitz et al. | 55/20 |
| 5,013,341 | 5/1991 | Isaksson et al. | 55/302 |
| 5,167,676 | 12/1992 | Nakaishi et al. | 55/96 |

FOREIGN PATENT DOCUMENTS

| | | |
|---|---|---|
| 0237824 | 9/1987 | European Pat. Off. |
| 3114068 | 11/1982 | Fed. Rep. of Germany |
| 3336487 | 4/1985 | Fed. Rep. of Germany |
| 3515345 | 7/1986 | Fed. Rep. of Germany |
| WO8807404 | 10/1988 | PCT Int'l Appl. |

*Primary Examiner*—Robert Spitzer
*Attorney, Agent, or Firm*—Oblon, Spivak, McClelland, Maier & Neustadt

[57] ABSTRACT

A filtering method of flue gas of a boiler employing a filter apparatus integrated with ceramic filters and provided with a control mechanism for regenerating the ceramic filter by reverse cleaning and a detecting mechanism for detecting directly or indirectly unburnt component. Valves of a compressed gas are operated by a signal from the control mechanism when flying-over of the unburnt component is detected to thereby start at once frequent reverse cleaning wherein the compressed gas is blown into the cleaned gas spaces and thereafter the frequent reverse cleaning having a period shorter than four minutes continues until the flying-over of the unburnt component decreases to a small quantity.

19 Claims, 9 Drawing Sheets

DOWN FLOW VELOCITY

FILTERING METHOD OF FLUE GAS OF A BOILER AND A FILTER APPARATUS FOR HOT GAS

BACKGROUND OF THE INVENTION

1. Field of the Invention

This invention relates to a filtering method of flue gas emitted from a boiler such as a pressurized fluidized bed combustion boiler or a coal direct firing boiler, employing a filter apparatus integrated with plate-like filters or filter tubes made mainly of ceramics such as of mullite species, cordierite species, silicon carbide species or the like, and a filter apparatus for hot gas preferably employed in filtering flue gas of a boiler.

2. Discussion of the Related Art

A filter apparatus integrated with ceramic filters has already been reduced to practice for filtering flue gas at an elevated temperature of a low-level radioactive waste incinerator. However, the dust concentration of the flue gas is small and the variation of a combustion load thereof is extremely small. In other words, currently, it has been reduced to practice for an extremely limited usage.

On the other hand, the filter apparatus integrated with ceramic filters, is considered to be a component technology or a key technology for reducing to practice a coal gasifier power generating plant or a power generation plant employing a pressurized fluidized bed combustion boiler, which is a clean (wherein the emitted flue gas is composed of low $NO_x$ and $SO_x$) energy technology of the next generation employing coal as fuel. Currently, intensive effort has been paid for the practical achievement of such a generation plant in various countries in the world.

In such a kind of power generation plant, power is generated by a combined cycle in two stages wherein power is generated by steam provided by a boiler and by driving a gas turbine by cleaned flue gas, which is obtained by removing dust from the flue gas after combustion under a pressurized state. Therefore, a power generating efficiency thereof is high. Since lime or dolomite is charged into the fluidized bed along with coal, almost no sulfur oxide ($SO_x$) is generated. Since a combustion temperature thereof is restrained to be equal to or below approximately 900° C., the generation of nitrogen oxide ($NO_x$) is in a small quantity.

In employing the filter apparatus integrated with ceramic filters in filtering hot flue gas of a power generation plant or the like, it is necessary that the filter apparatus correspond to various operating conditions of the whole plant. Especially, in filtering flue gas emitted from a pressurized fluidized bed combustion boiler employing coal as fuel, when it is operated to increase the boiler load, combustion oxygen in the boiler becomes deficient and a large amount of unburnt component including soot is emitted.

In case of a bubbling bed type pressurized fluidized bed combustion boiler, when a load thereof varies under a low-load condition wherein a bed height of the fluidized bed is low, even if the oxygen concentration is high, a large amount of unburnt component is emitted in the flue gas, and carbon monoxide having a concentration exceeding 1000 ppm is often contained in the flue gas. Under such a situation, the concentration of dust in the flue gas increases 5 to 10 times as much as that in a steady state, by flying-over of the unburnt component, and a ratio of the unburnt component such as soot contained in the dust may be not smaller than 30%.

In the filtering of flue gas in the pressurized fluidized bed combustion boiler, it is the general tendency to adopt a system which prevents erosion of a gas turbine by dust, by cleaning flue gas which has been precleaned by a cyclone at a prestage by a filter apparatus integrated with ceramic filters. However, in case of the cyclone, in a transient state wherein the dust concentration of the flue gas rapidly increases, the dust often overflow and an effective filtering function cannot be performed.

Moreover, the dust containing a large amount of unburnt component which pass through the cyclone, reaches ceramic filters of the filter apparatus. At this occasion, the dust concentration in the flue gas become 5 to 10 times as much as that in a steady state, and an increasing rate of a filtering pressure difference becomes 5 to 10 times as much as that in a steady state. In such a case, the operating conditions of the filter apparatus become unstable and finally the filtering function of the filter apparatus is lost.

Furthermore, there is a case wherein fuel is purged when the operation of the boiler is stopped, thereby blowing fuel which remains in a fuel charge manifold into the boiler. When this operation is performed just after a low-load operation, a large amount of coal powders are blown instantaneously through the pressurized fluidized bed combustion boiler, through the cyclone and reach the ceramic filters of the filter apparatus and the dust concentration in the flue gas reaches a value 100 to 300 times as much as that in the steady state.

In many tests in the filter apparatus wherein the filtering of flue gas in the pressurized fluidized bed combustion boiler is tested, the evaluation has been carried out under the condition wherein there is almost no variation of the boiler load. The reason is because the structure of the ceramic filters and the filter apparatus cannot stand the increase of filtering pressure difference by the dust laden gas having a high dust concentration containing unburnt component, generated by the variation of the boiler load, or a temperature variation caused by combustion of the unburnt component which takes place occasionally.

For instance, in a filter apparatus wherein ceramic filter tubes, each of which one end is closed, are arranged in a candle (candle stand) -like form (hereinafter candle type filter apparatus), disclosed in U.S. Pat. No. 4,904,287 and U.S. Pat. No. 5,059,227, since there is a problem in a supporting structure of a tube sheet made of a refractory alloy, when strong reverse cleaning is performed, the tube sheet and the filter tubes separately vibrate, the filter tubes or sealing parts thereof are damaged and the dusts leaks to the downstream side. Therefore, the reverse cleaning conditions are not determined by the necessary intensity of the reverse cleaning, but by the structural restrictions. Accordingly, when the filtering pressure difference becomes large, the reverse cleaning function becomes deficient, and as a result, the filtering becomes impossible due to the increase of the filtering pressure difference.

As another reason wherein a strong reverse cleaning of the filter cannot be adopted in the candle type filter apparatus, it is pointed out that the tube sheet is not cooled. Normally, the temperature of the flue gas emitted from the pressurized fluidized bed combustion boiler is in a range of 800° to 950° C. Therefore, creep of the tube sheet takes place when the filtering pressure difference becomes large even if the tube sheets made of a refractory alloy are employed.

Furthermore, since it is difficult to regulate flow in the space of the dust laden gas side, or the outside of the filter tubes into a smooth down-flow, there is a tendency wherein the dust adheres to and accumulates partially on the surface of the filter tubes in a large amount. When the adhered and accumulated unburnt component is ignited by any chance, it is combusted and serious damage is caused on the filter tubes.

Furthermore, in a filter apparatus provided with cross-flow filters having a structure of piled-up ceramic filter plates (hereinafter cross-flow type filter apparatus) described in Japanese Unexamined Patent Publication No. 198606/1990, when flue gas having a high dust concentration is to be filtered, gas passages are liable to be blocked by the dust. When strong reverse cleaning is necessary, the strength of the cross-flow filters is structurally insufficient. Accordingly, this device does not achieve a technical level wherein it can be operated under a variety of a boiler load.

In a filter apparatus having passages of dust laden gas penetrating inside of ceramic filter tubes (hereinafter tube type filter apparatus) disclosed in U.S. Pat. Nos. 4,584,003, 4,753,457, 4,867,769, 5,073,178 and the like, it is structurally possible to perform strong reverse cleaning. The filter apparatus is possible to be employed in a wide variety of operating conditions including those in a pressurized fluidized bed combustion boiler, by utilizing silicon carbide species or cordierite species ceramics for filter tubes.

In the tube type filter apparatus, since the inside of the filter tubes are passages for the dust laden gas, and the pressure difference of reverse cleaning gas is applied from outside of the filter tubes, mainly compressive stress is applied on the ceramics, and the pressure difference of the reverse cleaning does not help promote the damage of the filter tubes. Furthermore, the tube type filter apparatus is provided with the construction capable of achieving a large capacity by employing the filter tubes connected in the vertical direction and by piling up cleaned gas chambers. Since the dimensions of the tube sheets are comparatively small, the tube sheets can be cooled, if it is required. When the cooling is effective, the tube sheets do not creep even when strong reverse cleaning is performed. Therefore, it is possible to perform the strong reverse cleaning sufficiently. The apparatus can be employed under wide ranges of conditions of temperature, pressure and dust concentration.

That is to say, in the tube type filter apparatus, even when the dust concentration increases to some degree, it is possible to correspond thereto by previously designing the apparatus such that the strong reverse cleaning can be performed. Furthermore, in this filter apparatus, the flow of the dust laden gas is completely a down-flow and the flow area of the dust laden gas in the filter chamber is small, the dust is hard to be accumulated thickly on the filter, so long as an absolute quantity of the entrained unburnt component does not vary considerably. For instance, there causes no problem of thermal damage of the filter tubes or the like, so far as the unburnt component of approximately under 10% is always contained in the dust and the unburnt component combusts little by little.

However, even in the tube type filter apparatus, when a large amount of unburnt component flows into the apparatus in a short while, the dusts thickly adheres to and is accumulated on inner faces of lower end portions of the filter tubes wherein the down-flow velocities are almost null, the accumulated dust is ignited and combust in a short time, and temperatures at the portions of the filter tubes are elevated rapidly by the combustion heat. At this occasion, the temperature difference between the inside and the outside of the filter tubes exceeds an allowable temperature difference, and the filter tubes are destroyed by the thermal stress.

Furthermore, since the viscosity of gas is large at an elevated temperature, the dust in the hot gas floats against the gravity on the flow of the hot gas. Even when the main flow of the dust laden gas in a filter chamber (a space wherein solid-gas separation is performed in the filter apparatus) is constructed to be approximately a down-flow, a portion of fine dust floats against the gravity and is hard to drop down to the bottom of a hopper.

In an actual plant, flow of dust laden gas in the filter chamber constantly fluctuates by disorder of the dust laden gas flow caused by the operating conditions of the filter apparatus per se, or by disturbances at an upstream system or a downstream system of the plant, the turbulent flow of the dust laden gas accompanied by various secondary flows is constantly present in the filter chamber.

As a result, various phenomena causing the trouble mentioned below are generated in the filter chamber. One of the phenomena is bridging of dust, which is often observed in the candle type filter apparatus or the cross-flow type filter apparatus. By the presence of a transverse secondary flow or an upward secondary flow, even if the reverse cleaning of the ceramic filter is performed, the dust does not drop to the bottom of the hopper, and adhere again to the nearby ceramic filters. Finally, a portion of the flow passages on the side of the dust laden gas of the ceramic filters, is blocked by the accumulated dust, or a portion of the surface of the ceramic filters is covered with a thick accumulated layer of dust.

In case of the tube type filter apparatus, the gas flows at the lower end portions of the filter tubes fluctuate among the filter tubes, since the gas flow is influenced by a pressure and a velocity distribution of the dust laden gas at a gas inlet chamber of the vessel. It is clarified that there is even a filter tube wherein the dust laden gas flows reversely from the hopper.

When such phenomena take place and the dust is accumulated partially on the portions of the filter tubes, an effective filtration area of the ceramic filter decreases thereby decreasing the filtering capacity of the filter apparatus. In case of filtering the flue gas of the pressurized fluidized bed combustion boiler containing the unburnt component such as soot, the unburnt component contained in the accumulated dust is often ignited and combusted, and the ceramic filters receive a serious damage by the thermal stress caused by the combustion heat.

In filtering a synthetic gas in a coal gasifier plant, when the inner atmosphere is switched from a state, wherein the inside gas is filled with nonoxidizing gas, to air instantly after the stoppage of the operation, or oxidizing gas containing oxygen is introduced in the filter apparatus when the operation is restarted, the unburnt component in the accumulated dust is ignited and combusted whereby the ceramic filter receives a serious thermal stress damage.

A tube type filter apparatus is proposed in Japanese Examined Patent Publication No. 24251/1991, wherein the dust laden gas is extracted from the hopper (called blowing down) and is recirculated to the upstream of the filter apparatus. According to this filter apparatus, the dust laden gas at an elevated temperature having a high energy level is recirculated by the blowing down without depositing the dust laden gas to the outside, a downward flow is provided in the vicinity at the lower ends of the filter tubes, and the concentrated accumulation of dust at the lower end of the filter can be avoided. Therefore, the pressure difference of filtration can be decreased as a whole and the frequency of the reverse cleaning can be decreased.

However, a proper power is necessary to recirculate the dust laden gas. It is preferable to employ an ejector in use of steam or compressed air as a driving power, as a means of transporting the dust laden gas. However, the efficiency thereof is as small as approximately 4% at the most. This method can be employed in a case wherein a small quantity of the dust laden gas is recirculated. However, in recirculating a large amount of the dust laden gas, the energy loss is considerable.

Furthermore, recirculating the dust laden gas at an elevated temperature under pressure by a blower, is not a preferable method, since the installation of the blower is not easy and the blades of the blower are eroded by the dust. The recirculation of the dust laden gas is a potential method of solving the problem even in the case of the candle type filter apparatus. However, in this type of filter apparatus, since the flow area of the dust laden gas in the filter chamber is large, it is necessary to recirculate a large amount of the dust laden gas and the reduction of the method to practice is further difficult.

The blowing down operation wherein the dust laden gas is extracted from the hopper and is deposited, is experimentally performed with the effect being the same than with that in the blowing down operation wherein the recirculation is performed. However, the influence thereof on the efficiency of the plant is considerable and the extracted amount in a power generating plant is restricted to 1 to 2% of the total at the most. Therefore, a sufficient blowing down effect cannot be provided.

SUMMARY OF THE INVENTION

It is an object of the present invention to solve the above problem in the filter apparatus integrated with the ceramic filter, wherein the regenerating of the filter is performed by the reverse cleaning, and to provide a filtering method of flue gas of a boiler capable of avoiding the trouble which accompanies the thermal damage of the ceramic filters caused by introducing the dust laden gas containing the unburnt component such as soot, which is emitted occasionally in a large amount from a combustor such as a pressurized fluidized bed combustion boiler, into the filter apparatus, and a filter apparatus for hot gas having high reliability, which can be applied in the filtration of the pressurized flue gas of a boiler at an elevated temperature.

According to an aspect of the present invention, there is provided a filtering method of flue gas of a boiler employing a filter apparatus integrated with ceramic filters and provided with a control means for regenerating the ceramic filters by reverse cleaning and one or more detecting means for detecting directly or indirectly unburnt component, wherein valves of a compressed gas are opened and closed by a signal transmitted from the control means when flying-over of the unburnt component to the filter apparatus is detected, thereby starting at once frequent reverse cleaning wherein the compressed gas is blown into a space on the side of cleaned gas and thereafter the frequent reverse cleaning having an interval shorter than four minutes continues until the flying-over of the unburnt component decreases to a small quantity.

As a filter apparatus which can be employed in the invented filtering method of flue gas of a boiler, there is a filter apparatus such as the candle type filter apparatus, the cross-flow type filter apparatus, the tube type filter apparatus or the like, integrated with a ceramic filter, wherein regenerating of the filter is performed by reverse cleaning. In many cases compressed air is employed as a compressed gas. The unburnt component is a solid, mainly soot or combustible gas which is generated by thermally decomposing fuel.

Flying-over of the unburnt component can directly be detected by a sensor. Moreover, the flying-over can indirectly be detected by oxygen concentration or change of temperature in the vicinity of the filter. Furthermore, when the various conditions for emitting the unburnt component are known, the satisfied various conditions may be detected. An index wherein the unburnt component is emitting or has been emitted, is transmitted to a control means integrated with a computer. By the determination of the computer, a signal is transmitted to valves supplying compressed gas to reverse cleaning nozzles, the valves stay open for a short time (for instance 0.3 seconds), and the compressed gas is blown into a space on the side of cleaned gas of the filter apparatus.

In this case, the compressed gas discharged from the reverse cleaning nozzles flows in a direction reverse to that in the normal filtering operation across the walls of the ceramic filters, forming a large flow quantity by dragging in the ambient hot cleaned gas, removes the dusts accumulated on the surface of ceramic filters, and drops the dusts down to a hopper provided at the downward portion of the filter vessel. In this way, the ceramic filters are regenerated, the filtering pressure difference immediately after the reverse cleaning, is recovered to a value corresponding to a volumetric flow quantity of gas, and the quantity of the dust accumulated on the surface of the ceramic filters is maintained small by shortening the interval of the reverse cleaning.

In this way, since frequent reverse cleaning is started instantly after detecting the flying-over of the unburnt component, before or when the unburnt component such as soot or the like reaches the ceramic filter, the unburnt component does not accumulate thickly on the ceramic filter.

The frequent reverse cleaning is performed at least on a portion of the ceramic filters wherein dust is easily accumulated, at the frequency of more than twice as much as that in the normal operation, that is, a short interval of under four minutes. Accordingly, even when the unburnt component which is present in the vicinity of the ceramic filters and a gas containing oxygen is introduced, and the unburnt component is burnt on the surface of the ceramic filters or in the vicinity of the ceramic filters, since the quantity of the unburnt component to be burnt is small, and a combustion heat thereof is maintained low, a heat quantity is not generated so much as the ceramic filter is thermally damaged by the combustion heat. Therefore, the trouble due to the destruction of the ceramic filter can be avoided.

As for means of detecting the flying-over of the unburnt component, there are various means. In a preferable filtering method of flue gas of a boiler according to the present invention, the detecting means of the unburnt component detects increase of the dust concentration of flue gas. The increase of the dust concentration indicates that soot is emitted as dust in many cases and the unburnt component is directly detected.

In a preferable filtering method of flue gas of a boiler of this invention, the detecting means of the unburnt component is an optical sensor. In this case, purging is performed at the port of the optical sensor by blowing dry gas, such that windows or the port of the optical sensor do not get fogged by adhesion of the soots or moisture. The detection by the optical sensor is made by an intensity change of transmitted light wherein light from a light source such as a lamp or a laser transmits through the dust laden gas, or by an intensity change of light scattered by the dust. Therefore, the optical sensor provides a detecting method having high reliability.

In another preferable filtering method of flue gas of a boiler of this invention, the detecting means of the unburnt component detects increase of the pressure difference of the ceramic filters or increase of an increasing rate of the pressure difference of the ceramic filters. The reason why the pressure difference of the ceramic filters increases, is because dust is accumulating on the ceramic filters. The increase of the increasing rate of the pressure difference of the ceramic filters, indicates that the dust accumulates on the ceramic filters acceleratingly.

In another preferable filtering method of flue gas of a boiler of this invention, the detecting means of the unburnt components detects increase of temperature difference between positions of respective ceramic filters, or increase of temperature difference among cleaned gas chambers partitioned by tube sheets. The reason why the temperature of a portion of ceramic filters increases, is because at the portion, dust containing the unburnt component is accumulated and is burning. The reason why gas temperature in a cleaned gas chamber increases is because dust containing the unburnt component accumulated on the ceramic filters in the cleaned gas chamber, is burning.

The place wherein dust is thickly accumulated in the filter apparatus, is fixed and is easily predictable. Therefore, the flying-over of the unburnt component and the initiation of the burning can firmly be detected by installing a temperature sensor at the place. The place wherein the unburnt component is liable to be thickly accumulated, is in the vicinity of the lower ends of the filter tubes in the tube type filter apparatus, and in the candle type filter apparatus, the places are at the filter tubes in the vicinity of a cleaned gas header wherein the flow of the dust laden gas in the filter chamber is stagnated.

In another preferable filtering method of flue gas of a boiler of this invention, the detecting means of the unburnt component detects decrease of oxygen concentration in the flue gas or increase of absolute value of decreasing rate of the oxygen concentration. When the unburnt component flies over, or when the unburnt component is burning, the oxygen concentration decreases. Therefore, the flying-over of the unburnt component can indirectly be detected by the decrease of the oxygen concentration or by the increase of the absolute value of the decreasing rate of the oxygen concentration.

In another preferable filtering method of flue gas of a boiler of this invention, the detecting means of the unburnt component detects increase of carbon monoxide concentration in the flue gas or increase of increasing rate of the carbon monoxide concentration. Carbon monoxide is a combustible gas which is a kind of the unburnt component, which is normally emitted from a boiler along with soot or the like.

In another preferable filtering method of flue gas of a boiler of this invention, the detecting means of the unburnt component detects a load increase instruction of the boiler. When the load of the boiler increases, it is empirically known that a large amount of unburnt component is emitted continuously for a certain period. According to this detecting means, the flying-over of the unburnt component can be detected at an earlier timing.

In another preferable filtering method of flue gas of a boiler of this invention, the detecting means of the unburnt component detects a purge instruction of a fuel charge manifold of the boiler, wherein the reverse cleaning of the ceramic filter is performed by blowing temporarily compressed nitrogen gas.

It is known that, when the fuel charge manifold of the boiler is purged, dust containing a large amount of unburnt component is emitted from the boiler for a short while. Therefore, the ceramic filters are in a danger of receiving the thermal damage by the combustion of the unburnt component. Accordingly, it is preferable to perform the reverse cleaning of the ceramic filters by blowing compressed nitrogen gas instead of compressed air as a safety measure. Furthermore, it is preferable to perform a firm control determination employing a plurality of detecting means in detecting the flying-over of these unburnt components.

In another preferable filtering method of flue gas of a boiler of this invention, since the flue gas is a pressurized flue gas emitted from a pressurized fluidized bed combustion boiler, particularly from a bubbling bed type pressurized fluidized bed combustion boiler, having 8 to 20 atmospheric pressure, which cannot stably be filtered conventionally, it can be filtered stably by the invented filtering method.

In the bubbling bed type pressurized fluidized bed combustion boiler, a height of the fluidized bed formed in the boiler, is changed by controlling a quantity of charged sand, by which the control of the boiler load can easily be performed. Accordingly, a power generation plant which is easy in controlling power complying with the demand for electricity, can be provided.

When the dust concentration of the flue gas increases, or when the dust laden gas containing the unburnt component is emitted, to stably maintain the operation of the filter apparatus, the reverse cleaning of the ceramic filter must be performed without fail or a strong reverse cleaning is performed to recover the filtering pressure difference just after the reverse cleaning becomes a value always corresponding to the volumetric flow quantity of the gas. As compressed gas employed in the reverse cleaning, nitrogen gas, a process gas or steam can be employed instead of compressed air. In case of purging the fuel charge manifold, it is particularly effective to perform the reverse cleaning with a nonoxidizing compressed gas so as to restrain the combustion of the dust containing the unburnt component mixed with sparks which fly over temporarily. Furthermore, the same effect can be provided by directly charging nonoxidizing gas to a space of a filter chamber on the side of the dust laden gas.

However, considering a tendency of rapidly decreasing the oxygen concentration when the flying-over of the unburnt component is initiated, even if the burning is temporarily extinguished, so far as the quantity of the unburnt component floating in the dust laden gas does not decrease, when the oxygen concentration increases thereafter, an intense burning takes place. Furthermore, it is a preferable method to employ compressed air in the reverse cleaning and to perform the frequent reverse cleaning at the initial stage wherein the flying-over of the unburnt component is started, thereby removing the dust from the ceramic filters and burning the unburnt component contained in the dust little by little.

In another preferable filtering method of a boiler of this invention, the blowing down wherein the dust laden gas is extracted from the hopper provided at the lower portion of the filter vessel, is performed in parallel with the reverse cleaning. By performing the blowing down, the dust removed from the ceramic filters by the reverse cleaning is transferred to the hopper provided below along with the dust laden gas. In this way, it is prevented that the dust is again trapped by and accumulated on the ceramic filters. Accordingly, the trouble of thermally damaging the ceramic filters can firmly be prevented further by parallely employing the frequent reverse cleaning and the blowing down. The blown-down dust laden gas may be deposited in case that the quantity thereof is as small as 1 to 2% of the introduced dust laden gas. However, the blowing down of dust laden gas not smaller than 3% by recirculating the dust laden gas to the upstream portion of the filter apparatus is preferred.

According to another aspect of the present invention, there is provided a filter apparatus for hot gas integrated with ceramic filters, regenerating the ceramic filters by reverse cleaning and having one or more detecting means for directly or indirectly detecting flying-over of unburnt component to the filter apparatus and a control means, provided with a mechanism which opens and closes valves of a compressed gas by a signal transmitted from the control means when the flying-over of the unburnt component is detected thereby starting at once frequent reverse cleaning wherein the compressed gas is blown into a space on the side of cleaned gas, and continues the frequent reverse cleaning until the flying-over of the unburnt component decreases to a small quantity.

According to another aspect of the present invention, there is provided a filter apparatus for hot gas comprising:

ceramic filters incorporated in a vessel;
one or more reverse cleaning means for regenerating the ceramic filters by removing dust trapped by the ceramic filters;
a hopper provided at a lower portion of the vessel for collecting the removed dust;
a diffuser provided in the vicinity of a gas introducing port of the vessel or at a dust laden gas introducing pipe; and
one or more gas passages for communicating an inlet of the diffuser with the hopper;
wherein the dust laden gas at the hopper is recirculated to the vicinity of the gas introducing port of the vessel through the gas passages and the diffuser.

The gas flow velocity in a pipe transmitting the dust laden gas to the filter apparatus, is set to a large value to prevent the dust from adhering to or accumulating on the inside of the pipe, within a range wherein the pipe does not erode by erosion. The invented filter apparatus is provided with the diffuser wherein the pressure inside the vessel of the filter apparatus increases by converting most of the kinetic energy to the static pressure by the diffuser, and by utilizing the pressure difference, the dust laden gas of the hopper is sucked into an inlet of the diffuser wherein the static pressure of the dust laden gas is low, through a gas passage thereby recirculating the dust laden gas at the hopper to the upstream portion of the filter apparatus.

Since the filter apparatus is provided with such a recirculating means, it is possible to recirculate the dust laden gas of the hopper to the upstream portion by effectively utilizing only a little portion of a total energy of the dust laden gas introduced in the filter apparatus, without consuming utility such as compressed air. Because the recirculation of the dust laden gas from the hopper to the upstream portion of the filter apparatus can easily be performed, the blowing down of 3 to 30% of the dust laden gas is easy, and the filter apparatus can correspond to any design of the introducing pipe of the dust laden gas, any type of the filter apparatus, any kind of plant to which the filter apparatus is applied, and wide ranges of operating conditions at the upstream and the downstream of the plant. Furthermore, the apparatus makes the most of the energy of the dust laden gas at an elevated temperature, without depositing the blown-down dust laden gas.

In this specification, a diffuser indicates an equipment which achieves fluid-dynamically the function of a diffuser, that is, which achieves the function of converting the kinetic energy of the flowing gas into the static pressure. The diffuser includes a duct having a rounded portion at a gas inlet port of a vessel, and a construction wherein an orifice is provided in the vicinity of the gas inlet port of the vessel, and the static pressure becomes small at a little distance downstream from the orifice and increases the static pressure by widening the gas flow area further downstream, other than a divergent diffusion pipe.

In the filter apparatus wherein a sufficient quantity of the dust laden gas is blown down, the quantity of the dust trapped on the surfaces of the ceramic filters can significantly be decreased on an average by performing the reverse cleaning at the same frequency. In a steady state operation, the frequency of the reverse cleaning can be decreased. Furthermore, when the apparatus is employed in filtering flue gas of a boiler or the like, even if the dust containing the unburnt component is temporarily introduced in a large amount, so far as the blowing down is performed, a rate wherein the dust is trapped by the ceramic filters and accumulated thereon, is low. Accordingly, it is possible to firmly avoid the trouble of thermally damaging the ceramic filters by employing this filter apparatus and by performing the frequent reverse cleaning by detecting the flying-over of the unburnt component.

In a preferable filter apparatus for hot gas of this invention, the diffuser is a part of an ejector. In this specification, the ejector indicates an equipment having the construction wherein a throat or a nozzle is provided at the upstream portion of the diffuser. In case that a sufficient pressure difference cannot be provided for recirculating the dust laden gas from the hopper, by only converting the kinetic energy of the dust laden gas flowing in the pipe for introducing the dust laden gas into the vessel, to the static pressure, since the kinetic energy is increased by the throat or the nozzle, the pressure difference necessary for the recirculation of the sufficient quantity can easily be obtained by the ejector construction.

In another preferable filter apparatus for hot gas of this invention, the vessel is a pressure vessel and one or more gas passages are provided in the pressure vessel. Especially, in the filter apparatus for filtering pressurized hot dust laden gas, by providing the gas passages for recirculating the dust laden gas from the hopper to the gas introducing portion of the filter apparatus inside of the pressure vessel, it is not necessary to employ pressure pipings for the gas passages.

The gas passages for recirculating the dust laden gas from the hopper to the upstream portion of the filter apparatus, can be shortened by providing the gas passages inside of the pressure vessel. Therefore, it is possible to reduce the driving force required for the recirculation of the dust laden gas. It is not necessary to provide a thermal insulator outside of the gas passage since the gas passage is not provided outside of the vessel. There is no loss of thermal energy from the surface of the gas passage. Accordingly, the costs required for the fabrication and operation of the apparatus can be reduced.

In another preferable filtering apparatus for hot gas of this invention, the ceramic filters are composed of filter tubes of which both ends are open, the inside of the vessel is partitioned by a plurality of approximately horizontal tube sheets, a gas inlet chamber is provided above the top tube sheet, the plurality of filter tubes are retained by the tube sheets respectively at their both ends, and the dust laden gas flows inside of the filter tubes from the top side thereof down to the bottom side thereof.

When the filter apparatus for hot gas is the tube type filter apparatus of this kind, since the flow area of the dust laden gas in the filter chamber is small, even if the quantity of the dust laden gas recirculated from the hopper to the upstream portion of the filter apparatus is small, the blowing down effect stated as above can sufficiently be provided, the sectional area of the gas passage can be designed to be small, and the loss of energy of the introduced dust laden gas which is consumed for the recirculation of the dust laden gas, is small. The effective recirculation rate in the tube type filter apparatus, is not smaller than 3% of the dust laden gas introduced into the filter apparatus, preferably 5 to 15%. When the recirculation rate is more than 15%, the increasing rate of the obtained blowing down effect is small. When the dust laden gas is recirculated by more than 30%, there is a possibility of causing a superfluous disordered flow in the dust laden gas in the hopper and refloating the dust accumulated at the bottom of the hopper may take place.

In another preferable filter apparatus for hot gas of this invention, the ceramic filters are composed of filter tubes each of which is closed at one end thereof, wherein one or more filtration units are provided in the vessel, in which a plurality of filter tubes are installed at the top side or the bottom side of cleaned gas headers in approximately vertical direction, and the dust laden gas is filtered while flowing down from the top portion of the filtration unit along the external sides of the filter tubes.

In the filter apparatus having the construction wherein a diffuser is provided for recirculating the dust laden gas at the upstream portion of the filter apparatus or in the vicinity of the gas introducing port, even if the filter apparatus is provided with a large flow area of the dust laden gas in the filter chamber as in the candle type filter apparatus, the apparatus can be provided with a blow-down effect wherein there is no filtering portion of abnormal dust accumulation, by providing a plurality of absorbing ports at the hopper or the like to eliminate portions where the dust laden gas stagnates in the filter chamber. The preferable recirculation rate in this case is 10 to 25%, which can be achieved by employing a very small portion of energy of the dust laden gas introduced into the filter apparatus.

In another preferable filter apparatus for hot gas of this invention, a plurality of filtration units mentioned as above are provided in the vessel in the horizontal direction. The means of recirculating the dust laden gas from the hopper to the vicinity of the gas introducing port of the filter apparatus by generating the pressure difference by flowing the dust laden gas to be introduced through a diffuser, can preferably be employed in a large-scaled candle type filter apparatus such as a Tiered type filter apparatus wherein a plurality of filtration units are provided in the vessel in a layer-by-layer form. A practical filter apparatus for hot gas can avoid phenomena in which dust is abnormally accumulated at some portions of the ceramic filters, ignited and burnt, by providing dispersingly many absorbing ports at the hopper or the like, and by recirculating a sufficient quantity of the dust laden gas from the hopper to the vicinity of the gas introducing port of the filter apparatus.

Generally, the flow velocity in the introductory pipe for the dust laden gas of the filter apparatus is set to be comparatively high. However, there has been no case wherein a diffuser is provided at the gas introductory part for the dust laden gas of the filter apparatus with a purpose of recovering the static pressure. Furthermore, compared with the conventional design wherein the diffuser is not provided, even if the apparatus is provided with an ejector construction in which a throat is provided upstream of the diffuser, increase of the pressure loss in the filter apparatus can be restrained to a small value which is approximately equal to a piping loss required for the recirculation of the dust laden gas.

The filtering method of flue gas of a boiler and the filter apparatus for hot gas of this invention, are particularly preferable for a power generation plant integrated with the pressurized fluidized bed combustion boiler or the like which is a clean and high-efficiency energy technology in which coal is employed as fuel.

In the power generation plant employing the coal-fired pressurized fluidized bed combustion boiler, the emitted flue gas is clean as explained above and a high power generation efficiency is provided by employing both a steam turbine driven by steam of a boiler and a gas turbine driven by the flue gas. The filter apparatus is employed for the purpose of removing the harmful dust in the flue gas (which erode the gas turbine and shorten the service life) when the flue gas under pressure is used for driving the gas turbine.

DESCRIPTION OF THE PREFERRED EMBODIMENTS

A detailed explanation will be given of embodiments of a filtering method of flue gas of a boiler and a filter apparatus for hot gas of this invention, as follows. However, this invention will not be restricted by these embodiments.

EXAMPLE

Figure 1:
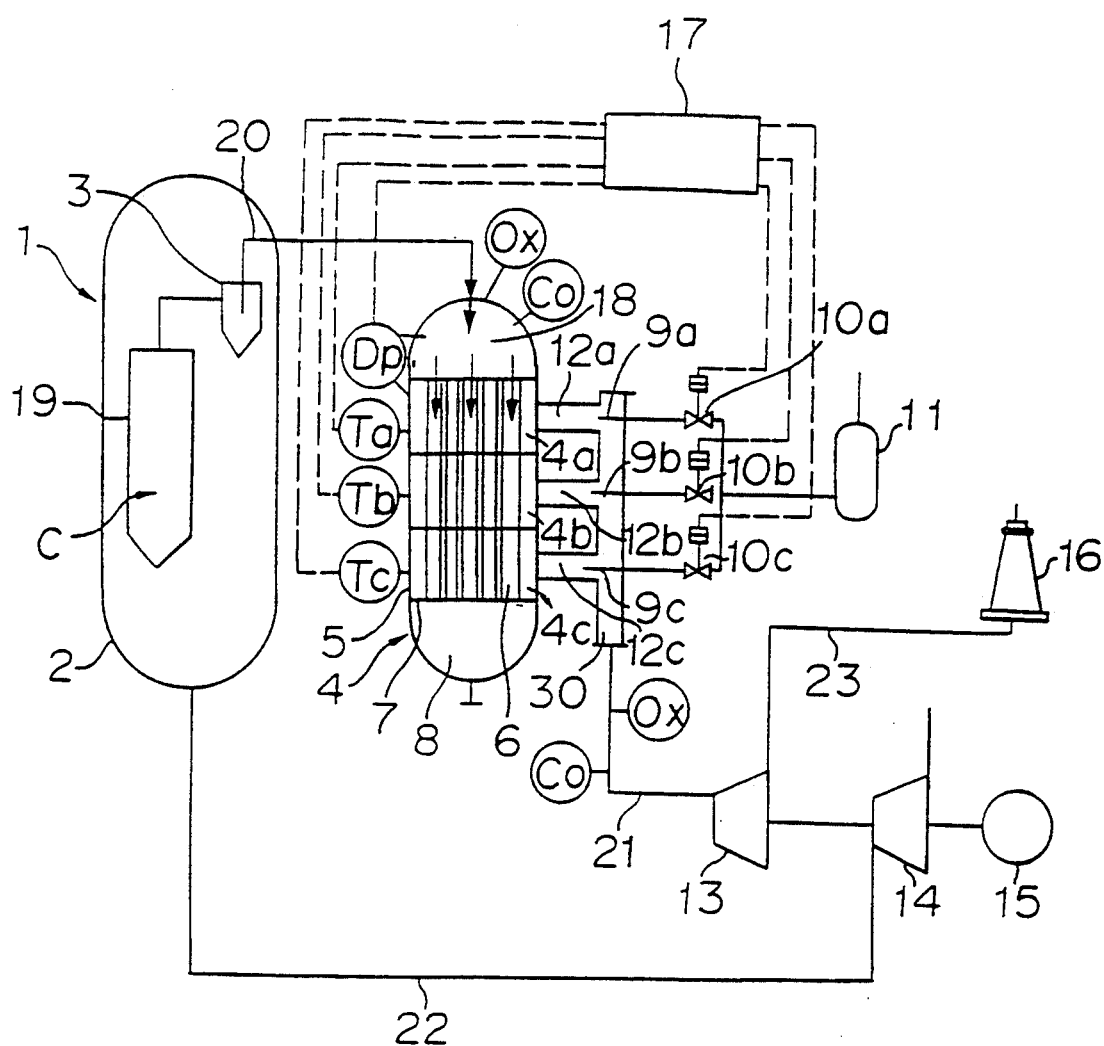
FIG. 1 is a conceptual diagram of a power generation plant in use of a pressurized fluidized bed combustion boiler for explaining an example of a filtering method of a boiler flue gas according to the present invention.

FIG. 1 is a conceptual diagram showing an example of employing a filter apparatus for hot gas of this invention in a power generation plant in use of a pressurized fluidized bed combustion boiler. In FIG. 1, a tube type filter apparatus 4 integrated with ceramic filter tubes 6 having flow passages of dust laden gas vertically penetrating the filter tubes 6, is shown.

In FIG. 1, the pressurized fluidized bed combustion boiler 1 is composed of a boiler main body 19, a cyclone 3 for pre-cleaning at the upstream of the filter apparatus 4, and a pressure vessel 2 incorporating a fuel charge manifold C and the above two.

The flue gas containing dust emitted from the boiler main body 19 of the pressurized fluidized combustion boiler 1, is transmitted to the filter apparatus for hot gas 4 by an upstream-side pipe 20 through a cyclone 3. In the filter apparatus 4, the inside of a pressure vessel 5 is partitioned by four approximately horizontal tube sheets 7. The vessel 5 of the filter apparatus 4 is sectioned into a gas inlet chamber 18, cleaned gas chambers 4a, 4b, 4c and a hopper 8 in this order from the top side thereof. The respective tube sheets 7 support both sides of the filter tubes 6. Cleaned gas outlet pipes 12a, 12b and 12c provided with reverse cleaning means, are respectively installed to each cleaned gas chambers 4a, 4b and 4c.

The tube sheets 7 are composed of a double-layered structure, of which the inside are cooled by hot water or steam. Furthermore, the cleaned gas outlet pipes 12a, 12b and 12c are assembled into a cleaned gas outlet 30.

Furthermore, reverse cleaning nozzles 9a, 9b and 9c are provided respectively in the cleaned gas outlet pipes 12a, 12b and 12c as reverse cleaning means. Diffusers (not shown) are provided in front of spouts of compressed air of the respective reverse cleaning nozzles 9a, 9b and 9c. Therefore, ejectors are composed by the diffusers and the reverse cleaning nozzles. When compressed air is discharged from the reverse cleaning nozzles 9a, 9b and 9c, reverse cleaning gas is blown into the cleaned gas chambers 4a, 4b and 4c in a flow rate of gas several times as much as that of the compressed air by dragging in the ambient hot cleaned gas.

Valves 10a, 10b and 10c which open and close at high speed, are respectively connected with pipes to the reverse cleaning nozzles 9a, 9b and 9c. Furthermore, the valves 10a, 10b and 10c are connected to a compressed air source such as a compressor, not shown, by pipings through a buffer tank 11.

As the compressed gas employed for the reverse cleaning, compressed air is inexpensive and convenient. However, cleaned process gas, pressurized steam, compressed nitrogen gas or the like can be employed. Especially, when purging is performed on the fuel charge manifold C, since the dust laden gas containing a large amount of unburnt component is temporarily introduced into the filter apparatus 4, it is preferable to employ nitrogen gas as the reverse cleaning gas for a safety measure so that the unburnt component does not ignite and burn in the vicinity of the filter tubes 6.

Pressure difference meters Dp are provided for measuring pressure differences between the gas inlet chamber 18 and the respective cleaned gas chambers 4a, 4b and 4c, part of which is shown in FIG. 1. An oxygen concentration meter Ox and a carbon monoxide concentration meter Co are provided at the gas inlet chamber 18. This oxygen concentration meter Ox and the carbon monoxide concentration meter Co may be provided at the upstream-side pipe 20.

The oxygen concentration meter Ox and the carbon monoxide concentration meter Co are also provided at a downstream-side pipe 21. These oxygen concentration meters Ox and carbon monoxide concentration meters Co are shown as monitors which are not connected to a control unit 17. However, when measured values of these meters are employed for detecting and controlling the unburnt component, these meters are connected to the control unit 17.

Furthermore, sheathed thermocouples Ta, Tb and Tc for measuring gas temperature are respectively provided at the cleaned gas chambers 4a, 4b and 4c.

Signals from the pressure difference meters Dp, signals from the sheathed thermocouples Ta, Tb and Tc, a signal from the oxygen concentration meter Ox, and a signal from the carbon monoxide concentration meter Co are inputted into the control unit 17 integrated with a computer as a control means, and are stored in a memory of the computer as data. Based on these data, analysis, conversion, calculation and determination are performed in the control unit 17. The valves 10a, 10b and 10c are opened and closed by transmitting signals from the control unit 17 to the valves 10a, 10b and 10c connected to the reverse cleaning nozzles 9a, 9b and 9c for discharging compressed gas in the timing of reverse cleaning, by which reverse cleaning and regeneration of the filter tubes provided in the corresponding cleaned gas chambers of the filter apparatus is made.

The downstream-side pipe 21 is connected to a gas turbine 13. Gas discharged from the gas turbine 13 is exhausted outside by a chimney 16 through a discharge pipe 23. The rotating shaft of the gas turbine 13 is coaxially connected to the rotating shaft of the compressor 14 and also connected to the rotating shaft of a generator 15, thereby performing power generation. Compressed air obtained at the compressor 14 is supplied to the pressure vessel 2 of the pressurized fluidized bed combustion boiler 1 through a compressed air pipe 22.

In a preferable filter apparatus for flue gas of this invention, a signal showing rapid increase of the pressure difference of filter detected by the pressure difference meter Dp, is employed as an index for starting frequent reverse cleaning. As a specific example, when an average value of an increasing rate of the pressure difference in a predetermined time (for instance 90 seconds) exceeds twice as much as the average value of the increasing rate of the pressure difference of filter in a predetermined time (for instance 90 seconds) just before the previous predetermined time, except a period of the rapid increasing rate thereof when the pressure difference of filter recovers just after the reverse cleaning (approximately 1 to 2 seconds), the computer in the control unit 17 judges that this change is taking place, issues the order of the reverse cleaning and at once starts the frequent reverse cleaning. In this specification, the increasing rate of the filtering pressure difference designates a differential value wherein an increased amount of the filtering pressure difference is divided by a very small time.

The time interval for obtaining the average value of the increasing rate of the filtering pressure difference, is preferably a short one in a range of not picking up pressure variation, such as variation of the filtering pressure difference detected by the pressure difference meter Dp when the reverse cleaning is performed, change of the filtering pressure difference caused by pulsation of the discharge pressure of the compressor, pulsation accompanied by motion of a flow medium in the boiler main body 19 or the like. Furthermore, the judgment of kinds of pulsations detected by the pressure difference meter Dp, may be performed by the computer and the changes of the filtering pressure difference by these pulsations other than the filtering pressure difference to be detected, are excluded.

The interval of the reverse cleaning in a steady state operation in this example is 10 to 20 minutes with respect to each of the cleaned gas chambers 4a, 4b and 4c. However, when the frequent reverse cleaning is started by detecting the flying-over of the unburnt component, the reverse cleaning is performed preferably at the interval of within four minutes for a certain time, and preferably three minutes. Thereafter, the average value of the increasing rate of the filtering pressure difference in a predetermined time (preferably within 60 seconds), except a period of rapid variation of the filtering pressure difference of 1 to 2 seconds just after the reverse cleaning, is obtained and the frequent reverse cleaning preferably continues until either one of the following states results.
1) The increasing rate of the filtering pressure difference converges on a value corresponding to the flow rate of the dust laden gas at the time.
2) The increasing rate of the filtering pressure difference converges on a predetermined value (for instance, the increasing rate of the filtering pressure difference after four times successive reverse cleanings performed are within a constant value ±30%, preferably 20%).

When a tendency is found wherein the increasing rate of the filtering pressure difference rapidly decreases, the tendency indicates that the unburnt component in the trapped dusts on the filter are burning. Therefore, it is preferable not to stop the frequent reverse cleaning at that time.

As another example of employing the signal of the increasing rate of the filtering pressure difference from the pressure difference meter Dp, as an index for starting the frequent reverse cleaning, it is preferable to set a constant value of the increasing rate of the filtering pressure difference. That is to say, when the average value of the increasing rate of the filtering pressure difference in a predetermined time (for instance 60 seconds) in running the filter apparatus, exceeds a constant value, for instance a value 1.3 times as much as the increasing rate of the average filtering pressure difference at the maximum load is set in the control unit, excluding the increasing rate when the filtering pressure difference recovers rapidly just after the reverse cleaning, for starting the frequent reverse cleaning. Furthermore, as an example of selecting a constant value in filtering the flue gas from the pressurized fluidized bed combustion boiler, the increasing rate of 40 mm/min in water column may preferably be employed as an index for starting the frequent reverse cleaning.

In other examples of this invention, the invented method is applied to a filter apparatus of a type wherein the flow of the dust laden gas in the pressure vessel of the filter apparatus is composed of a downward flow or a mixture of a downward flow and a radial flow or a horizontal flow, that is, the tube type filter apparatus mentioned above, the Tiered type filter apparatus suggested in U.S. Pat. No. 4,904,287 (hereinafter, a downward flow type filter apparatus) or the like. As an index for starting the frequent reverse cleaning, a difference between a temperature in the bottom cleaned gas chamber or in a bottom space on the side of the cleaned gas (hereinafter, the bottom cleaned gas space, for instance, 4c in FIG. 1) and that in other cleaned gas chamber or in an upper space on the side of the cleaned gas (hereinafter, the other cleaned gas space, for instance, 4b in FIG. 1), or preferably an increasing rate of the temperature difference is adopted.

That is to say, when the increasing rate of the temperature difference between the bottom cleaned gas space and either one of the other cleaned gas spaces, exceeds a constant value, for instance, 20° C./min, preferably 5° C./min, the frequent reverse cleaning is started at once. As an interval of the frequent reverse cleaning, an interval of within 4 minutes, preferably 3 minutes, is employed for at least a portion of the ceramic filters wherein the rapid accumulation of dust containing the unburnt component is predicted.

Furthermore, the stop instruction of the frequent reverse cleaning is issued when the increasing rate of the temperature difference is once nullified, turned into a minus value and again nullified, and when the temperature difference between the bottom cleaned gas space and the other cleaned gas space becomes equal to or less than ±5° C., preferably ±3° C. In this case, the stop instruction of the frequent reverse cleaning is issued after a constant time from when the increasing rate of the temperature difference becomes once nullified, turned into a minus value and again nullified, preferably, for instance, 5 minutes, more preferably 10 minutes.

At this point, the reason why the issue of the stop instruction of the frequent reverse cleaning is retarded for a time of 5 to 10 minutes, is because the unburnt component in the dust adhering to the surface of the filters and still burning, should completely be removed away by the frequent reverse cleaning. Furthermore, the method of preventing the thermal damage of the ceramic filters caused by the burning of the unburnt component in the entrained dust on the surface of the filters, by issuing the frequent reverse cleaning instruction by detecting the temperature difference between the respective cleaned gas spaces or the increasing rate of the temperature difference, is similarly applicable to the candle type filter apparatus wherein the filtration is performed on the outer surfaces of the filter tubes.

Figure 3:
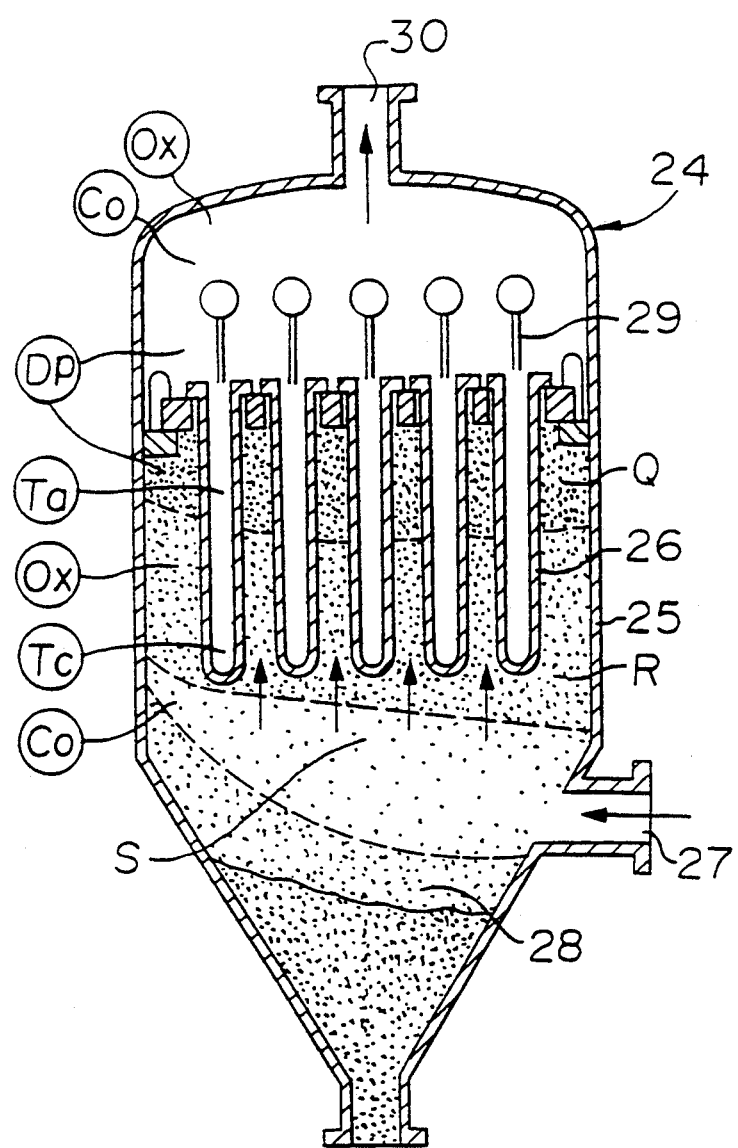
FIG. 3 is a longitudinal sectional diagram showing an example of applying a filtering method of flue gas of a boiler of this invention to a candle type filter apparatus.

For instance, in case of the candle type filter apparatus 24 shown in FIG. 3, at least one of the filter tubes 26 is provided with thermocouples Tc and Ta at the inner lower portion and the inner upper portion. The symptom of the burning on the outer surface of the filter tube 26 is detected by the increase of the temperature difference or by the increasing rate of the temperature difference. The frequent reverse cleaning is performed by instantly issuing the order of the reverse cleaning, thereby removing the dust containing the unburnt component which are trapped on the filter tubes, and preventing the thermal damage of the filter tubes caused by the burning of the unburnt component.

In another example of the invention, as the index for starting the frequent reverse cleaning, change of an oxygen concentration in the gas detected by the oxygen concentration meter Ox which is installed to the filter apparatus 4 or in the vicinity thereof, is employed (FIG. 1). In this case, the measured value of the oxygen concentration of the gas is transmitted to the computer in the control unit 17, and is temporarily stored in the memory. A decreasing rate of the oxygen concentration is calculated. When the decreasing rate of the oxygen concentration reaches a value of not less than 0.4%/min, excluding the period of approximately 1 to 1.5 minutes after a reverse cleaning (including both the frequent reverse cleaning as a countermeasure against the unburnt component in the entrained dust and the reverse cleaning which is previously programmed and periodically performed), the start instruction of the frequent reverse cleaning is issued.

Thereafter, the frequent reverse cleaning continues preferably for a duration of time of 20 minutes at an interval of 30 seconds to 4 minutes. Furthermore, it is preferable to change the interval of the frequent reverse cleaning according to the increasing rate of the filtering pressure difference, and shorten the interval when the increasing rate of the filtering pressure difference is large.

Even in the case wherein the decreasing rate of the oxygen concentration is nullified, when the oxygen concentration is low compared to that in a steady state running, the generation of the unburnt component continues. Therefore, the frequent reverse cleaning had better not stop instantly after the decreasing rate of the oxygen concentration is nullified. Normally, it is preferable to continue the frequent reverse cleaning until the burning of a boiler is stabilized and the oxygen concentration is turned to increase and stabilized.

Furthermore, the stop instruction of the frequent reverse cleaning may be issued by an index of an increasing rate of the filtering pressure difference. For instance, the stop instruction of the frequent reverse cleaning is issued, 1) when the increasing rate of the pressure difference converged to an expected value complying with the introducing flow rate of the dust laden gas, or
2) when the increasing rate of the filtering pressure difference converges to a set value (for instance, the increasing rate of the filtering pressure differences of the successive four times reverse cleaning are within a set value ±30%, preferably 20%).

In another example of a filter apparatus wherein the start instruction of the frequent reverse cleaning is issued based on the index of the oxygen concentration of the introduced dust laden gas. The oxygen concentration meters are attached to the respective cleaned gas chamber of the down-flow type filter apparatus, or at the bottom cleaned gas space and at either one of the other cleaned gas spaces, and the frequent reverse cleaning is started when the difference between the oxygen concentrations of the cleaned gas spaces or the decreasing rate of the oxygen concentration in the cleaned gas becomes a predetermined value.

In another example of a filter apparatus of this invention, as the index for starting the frequent reverse cleaning, change of a carbon monoxide concentration detected by a carbon monoxide concentration meter attached to the filter apparatus or the vicinity thereof, can be employed. For instance, when the carbon monoxide concentration increases to a set value in a range of 500 ppm to 1000 ppm (volume base), the starting of the frequent reverse cleaning can be instructed. However, according to the experience of the inventors, since the carbon monoxide concentration in the dust laden gas to be processed considerably varies by the reverse cleaning condition or by other factors, it is preferable that the change of the carbon monoxide concentration is employed as an index complementing the other mainly employed index or indices.

In an example wherein the filter apparatus of this invention is applied to a bubbling bed type pressurized fluidized bed combustion boiler, the starting instruction of the frequent reverse cleaning is related to a change in a bed height of a fluidized bed of the boiler, that is, a change of a combustion load of the boiler. For instance, when instruction for performing a load increasing operation at a rate of not less than 2%/min (preferably, 1.5%/min) is instructed to a boiler (or a little before and after the instruction), the starting of the frequent reverse cleaning is issued. The period of the frequent reverse cleaning in this case is within 4 minutes, preferably 3 minutes.

The stoppage of the frequent reverse cleaning is preferably performed by the judge of the computer in the control unit, wherein, after the operation of the boiler load change or the bed height change is finished, and normal conditions of the increasing rate of the filtering pressure difference, the temperature difference between the bottom cleaned gas space and the other cleaned gas space, the oxygen concentration of the dust laden gas and the like have been recovered and stabilized.

In the tube type filter apparatus wherein the flow of the dust laden gas in the filter apparatus is completely a downward flow, or in a candle type filter apparatus (refer to FIGS. 7 and 9) wherein filtration units (candle) are arranged vertically in multi-layers or in multi-stages as in the Tiered type filter apparatus disclosed in U.S. Pat. No. 4,904,287, in which the flow of the dust laden gas is designed to be a downward flow, it is preferable to perform the reverse cleaning successively starting from the bottom cleaned gas chamber or from the bottom filtration unit.

The reason is because, since the viscosity of gas is large at an elevated temperature, fine dust which has passed through a pre-cleaning device utilizing inertia such as in a cyclone, receives the influence of the viscous flow of hot gas more than that of the gravity. The dust is not trapped so much on the filter at the upper portion of the apparatus wherein the velocity of the downward gas flow is large (Especially, in the tube type filter apparatus wherein the flow is a completely downward flow, the dust accumulating on the upper wall of the filter tubes is scrubbed down by the downward gas flow having a large flow velocity), and are apt to be trapped on the lower wall of the filter tubes or on the filtration unit at the lower portion of the apparatus wherein the velocity of the downward gas flow is null or near to null.

Figure 2A:
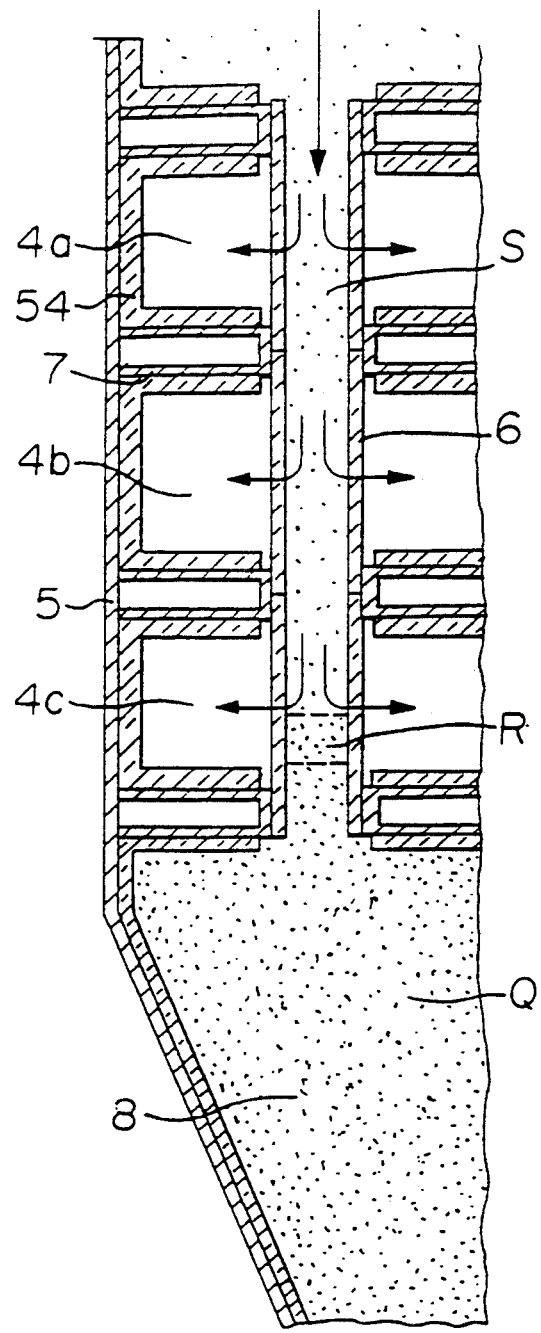
FIGS. 2A and 2B show a partial sectional diagram (FIG. 2A) for explaining a state in use of a conventional tube type filter apparatus and a graph (FIG. 2B) showing a distribution of a down flow velocity of dust laden gas in an installed ceramic filter tube.
Figure 2B:
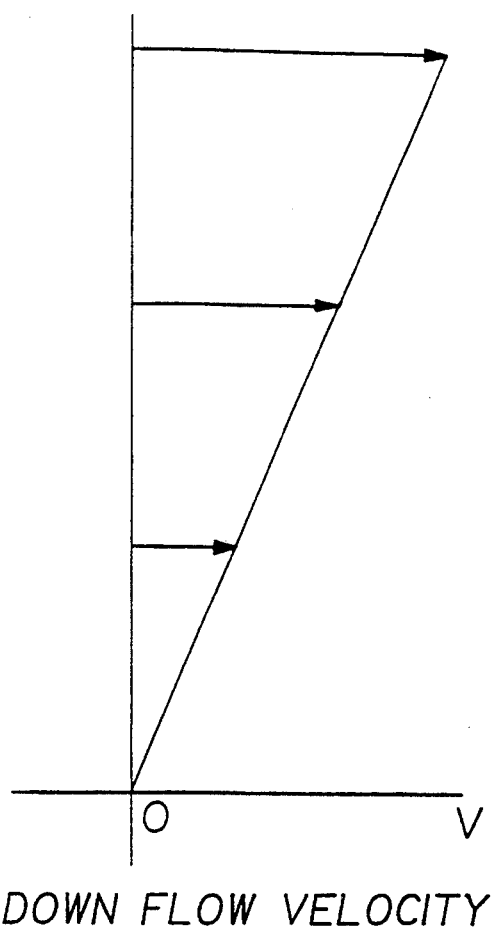

An explanation will be given of the above phenomena according to a schematic diagram (FIGS. 2A and 2B). FIG. 2A is a partial longitudinal sectional diagram of a conventional tube type filter apparatus, whereas FIG. 2B is a graph showing a down flow velocity of dust laden gas at corresponding height in the filter tube 6. In FIG. 2A, notations 4a, 4b and 4c designate cleaned gas chambers, 5, a pressure vessel, 6, a filter tube, 7, a cooled tube sheet, 8, a hopper, 54, thermal insulator, S, a portion wherein a spacial dust concentration is low, R, a portion wherein the spacial dust concentration is rather high, and Q, a portion wherein the spacial dust concentration is very high (in this diagram, reverse cleaning means are not shown).

As shown in FIGS. 2A and 2B, in the tube type filter apparatus, the down flow velocity decreases approximately linearly in accordance with the downward movement of the dust laden gas in the filter tube 6, and is approximately null at the bottom. Accordingly, the spacial dust concentration in the filter tube 6, remarkably increases in the vicinity of the bottom in the filter tube 6. Furthermore, FIGS. 2A and 2B schematically show a distribution of the spacial dust concentration (a quantity of floating dusts per unit volume) in the filter tube 6 and in the hopper 8. It is considered that the change of the down flow velocity of the dust laden gas in the pressure vessel is similar to that in FIGS. 2A and 2B also in the other down-flow type filter apparatus.

Moreover, it has been revealed by the research of the inventors, that in the tube type filter apparatus, the burning of the unburnt component takes place only on the inner surface of the lower half portion of the filter tube 6 in the bottom cleaned gas chamber 4c, and the filter tube 6 at this portion is thermally damaged.

FIG. 3 is a longitudinal sectional diagram of a candle type filter apparatus according to the invention, wherein a distribution of the spacial dust concentration in the candle type filter apparatus is schematically shown. In FIG. 3, a candle type filter apparatus 24 is composed of a pressure vessel 25, filter tubes installed in a candle form 26, a hopper 28, reverse cleaning nozzles 29, an oxygen sensor Ox, a carbon monoxide sensor Co, a pressure difference meter Dp and temperature sensors Tc and Ta (the control means are not shown).

In this filter apparatus, the flue gas containing dust enters from a gas introducing port 27, and flows up in the direction of the arrow mark along the respective filter tubes 26. The dust laden gas is filtrated by flowing from the outside to the inside of the filter tubes 26, and becomes cleaned gas, which flows up inside of the filter tubes 26 and is exhausted from a cleaned gas outlet 30.

According to the opinion of the inventors, the upper space of the filter chamber of the candle type filter apparatus in use, is occupied by the dust laden gas of a very high dust concentration. Moreover, it is considered that even in the candle type filter apparatus of Tiered type, the surrounding of the filter tubes in the vicinity of the cleaned gas header which is installed at the central portion of the filtration unit is occupied by the dust laden gas having a high dust concentration as in FIG. 3, although this may not be applicable to the filter tubes situated at the peripheral portion of the filtration unit (candle) contacting the down gas flow. The filtering method of flue gas of a boiler of this invention is preferably applicable to a candle type filter apparatus.

For instance, in the candle type filter apparatus wherein a single filtration unit is arranged as shown in FIG. 3, the pressure difference meter Dp is installed for measuring difference of pressures between the spaces on the side of the dust laden gas and the cleaned gas, the oxygen concentration meters Ox and the carbon monoxide concentration meters Co are installed at the spaces on the side of the dust laden gas or at the side of the cleaned gas (or both), which detect the change of these gas concentrations, and the frequent reverse cleaning is performed instantly after the flying-over of the dust containing the unburnt component is detected. In this case, a very frequent reverse cleaning (the interval is preferably not more than 2 minutes, more preferably one minute, which is different from that in the down-flow type filter apparatus).

In this way, similar to the case of the tube type filter apparatus, the frequent reverse cleaning is started immediately after the flying-over of the dust containing the unburnt component is detected, and the frequent reverse cleaning continues for a while until the dust containing the unburnt component does not accumulate on the surface of the filter tubes in the vicinity of the cleaned gas header of the filtration unit and does not ignite, or the dust containing the unburnt component does not accumulate thereon so thick that the filter tubes are thermally damaged when the dust is ignited.

Figure 4:
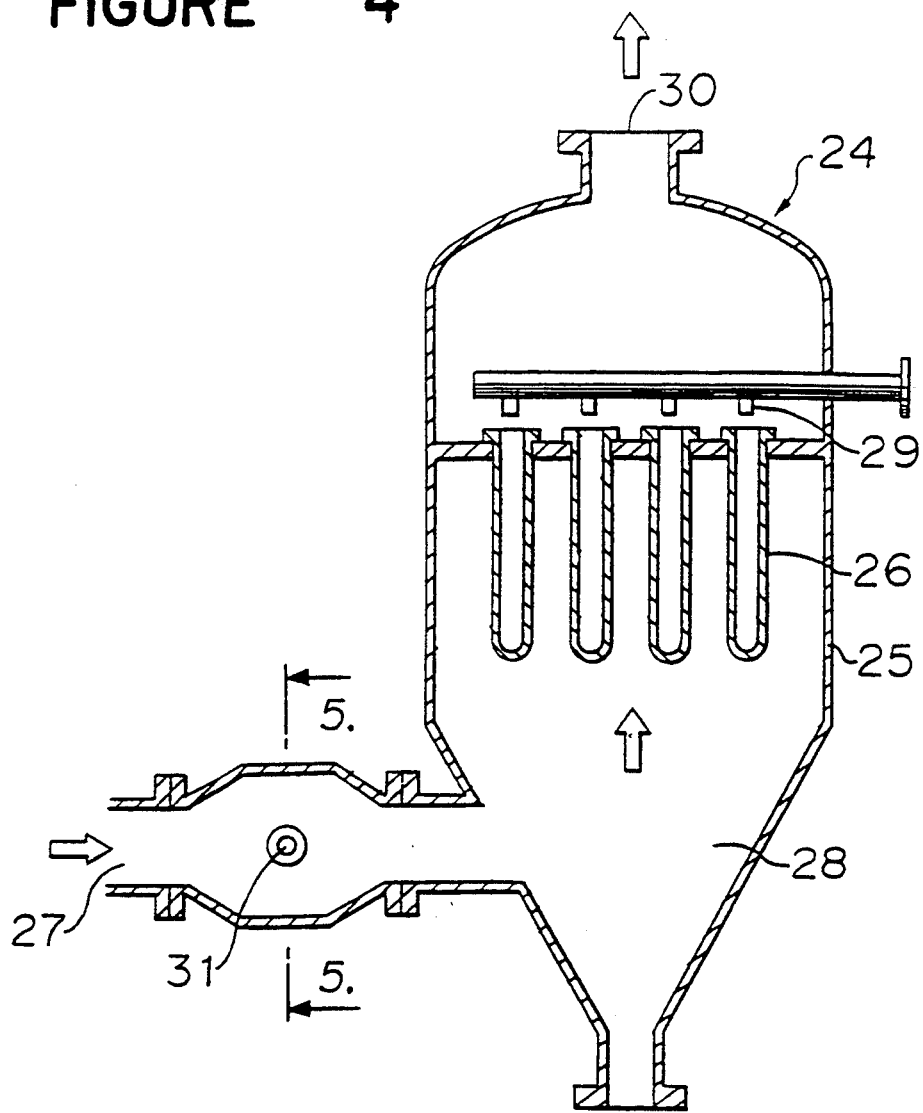
FIG. 4 is a longitudinal sectional diagram showing another example of applying the construction of a filter apparatus of this invention to a candle type filter apparatus.
Figure 5:
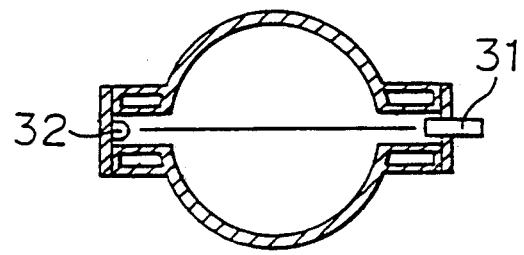
FIG. 5 is a sectional diagram taken along a line A—A of FIG. 4.

FIG. 4 is a longitudinal sectional diagram of another candle type filter apparatus according to the present invention, and FIG. 5, a sectional diagram taken along a line A—A of FIG. 4. In FIGS. 4 and 5, a reference numeral 31 designates an optical sensor and 32, a halogen lamp. The flying-over of the dust containing the unburnt component is detected by the optical sensor 31, the signal of detection is transmitted to a control means, not shown, and the frequent reverse cleaning of the filter tubes 26 is performed by discharging compressed air from the reverse cleaning nozzles 29 by opening and closing valves, not shown, by the order from the control means. In this example, the detection of light is performed by detecting the change of the transmitted light as shown in FIG. 5. However light scattered by the dust may be detected.

TEST EXAMPLES

Test Examples will be introduced as follows as for a case wherein the invented filtering method is employed and a case wherein a conventional filtering method is employed.

The tube type filter apparatus (maximum dust laden gas treating capacity 8000 $Nm^3/hr$) having the top, middle and bottom cleaned gas chambers 4a, 4b and 4c as shown in FIG. 1, is integrated into a test power generation plant of a bubbling bed type pressurized fluidized bed combustion boiler (maximum load capacity 6 MW, attached with a cyclone for pre-cleaning) employing coal as fuel, and the boiler load is increased from 50% to 75% wherein the increasing rate is 3%/min.

1) The case wherein the invented filtering method is not employed (conventional reverse cooling is performed without detecting the unburnt component in flue gas):

Simultaneously with the start of increase of the boiler load, the increasing rate of the filtering pressure difference rapidly increases from 24 mm/min in water column to 56 mm/min in water column, and the oxygen concentration in the flue gas rapidly decreases. Furthermore, the temperature of the bottom cleaned gas chamber 4c rapidly increases 2 minutes after the boiler load has increased to 75% (until that time the respective cleaned gas chambers keep approximately equal temperature). After 2 minutes has elapsed further, the temperature of the bottom cleaned gas chamber 4c becomes higher than those of the other cleaned gas chambers by approximately 100° C. After one minute has elapsed further, the filtering pressure difference rapidly decreases, and emission of dark smoke from the chimney 16 which has not been observed, is recognized.

When the operation of the boiler is immediately stopped and the inside of the filter apparatus 4 is checked, it is found that one of the filter tubes 6 (made of cordierite species ceramics having a small thermal expansion coefficient) is chipped off by about 30 cm from the lower end. It is determined that the filter tube 6 is damaged by the thermal stress caused by the combustion heat of the unburnt component contained in the dust, from the appearance of cracks of the filter tube 6 and an approximate calculation of the thermal stress.

2) The case of the invented filtering method:

The frequent reverse cleaning of 3 minutes interval is started when the increasing rate of the filtering pressure difference reaches 40 mm/min in water column by employing the same tube type filter apparatus, and by employing a signal of the filtering pressure difference detected by the pressure difference meter, as an index of starting the frequent reverse cleaning. The stoppage of the frequent reverse cleaning of 3 minutes interval is instructed at a time wherein the increasing rate of the filtering pressure difference after successive four times reverse cleaning, converges to a standard filtering pressure difference at 75% boiler load ±10%. In this way, with the start of the increase of the boiler combustion load, the increasing rate of the filtering pressure difference rapidly increases from 20 mm/min in water column to 40 mm/min in water column. Therefore, immediately thereafter, the frequent reverse cleaning of 3 minutes interval is started with respect to each of the cleaned gas chambers.

At this moment, the difference of temperatures of the bottom cleaned gas chamber 4c and the other cleaned gas chambers, shows a peak value 10 minutes after the start of the rapid increase of the filtering pressure difference. However, the temperature difference is about 8° C. and the increasing rate of the temperature difference is about 0.8° C./min which are small values. A check is made on the filter apparatus 4 after test operation of the plant has been finished. However, no crack is recognized in the filter tubes 6 and the emission of dark smoke from the chimney is not recognized.

According to the result of the above test, since, in the invented filtering method of flue gas of a boiler, the flying-over of the unburnt component is directly or indirectly detected and the frequent reverse cleaning is immediately started. Therefore, the dust containing the unburnt component does not accumulate on the filter tubes 6 up to a thickness whereby the dust is easy to ignite, even in the vicinity of the lower ends of the filter tubes 6 wherein the down flow velocity of the dust laden gas is slow. Even if the dust is ignited, the dust containing the unburnt component does not accumulate on the filter tubes so thick that the filter tubes are thermally damaged.

During this test operation, a tendency is recognized wherein the dust containing the unburnt component collide each with other in the spaces to flocculate into large particles at the upper portions of the filter tubes 6, by performing the frequent reverse cleaning, and these large particles are accelerated to drop down into the hopper 8.

Figure 6:
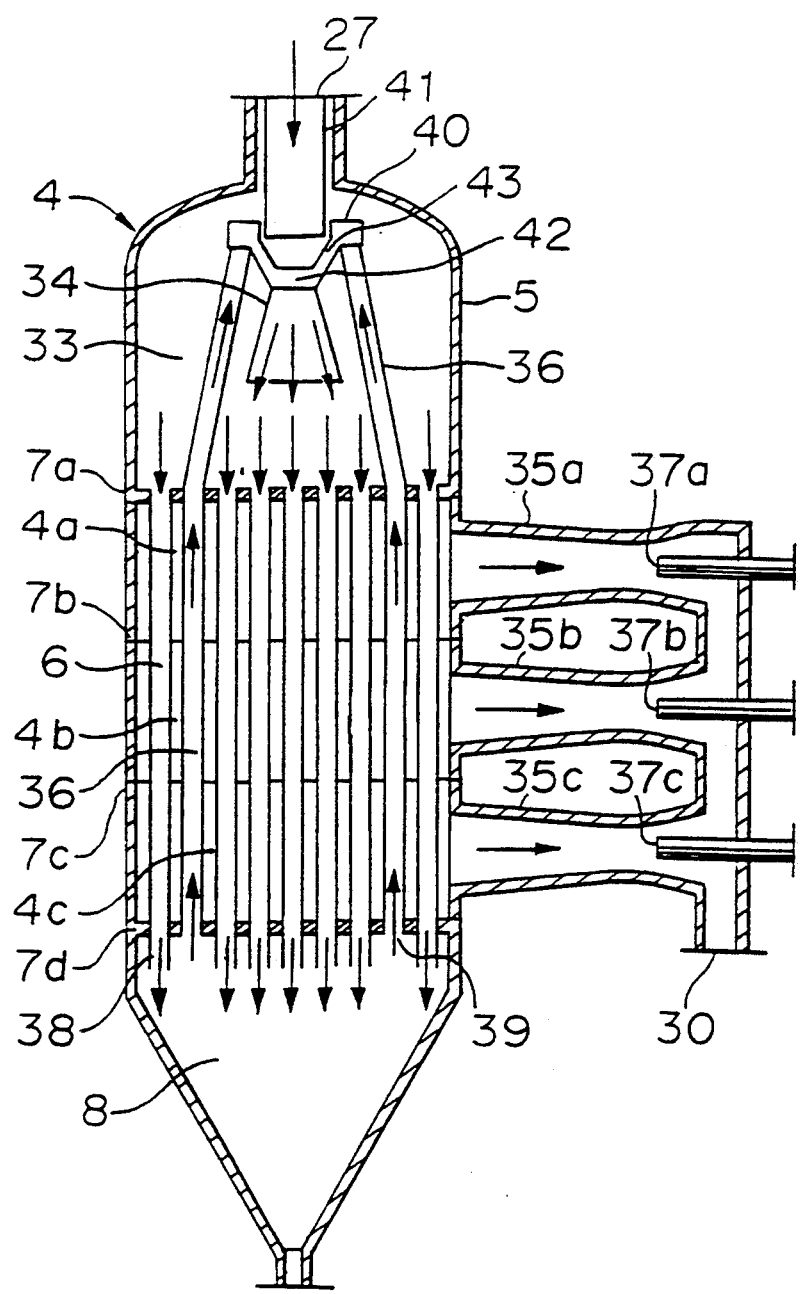
FIG. 6 is a longitudinal sectional diagram showing an embodiment of a filter apparatus for hot gas according to the present invention.

FIG. 6 is a longitudinal sectional diagram showing an embodiment in case that the invented filter apparatus for hot gas is applied to the tube type filter apparatus. In FIG. 6, a notation 4 designates a tube type filter apparatus, 5, a pressure vessel, 6, a filter tube, 7a, 7b, 7c and 7d, tube sheets supporting the respective filter tubes 6 and partitioning the inside of the pressure vessel 5 (7a and 7d divide a dust laden gas space from a cleaned gas chamber, and the other tube sheets divide the cleaned gas chambers), 33, a gas inlet chamber which uniformly distributes the flown-in dust laden gas to the respective filter tubes 6, 8, a hopper, 34, a diffuser, 4a, 4b and 4c, top, middle and bottom cleaned gas chambers and 27, a gas introducing inlet port.

Furthermore, notations 35a, 35b and 35c designate cleaned gas outlet pipes which are also utilized as diffusers of ejectors for reverse cleaning the top, the middle and the bottom cleaned gas chambers, 30, a cleaned gas outlet, 36, a gas passage of a refractory metal pipe wherein the dust laden gas extracted from the hopper 8 flows, 37a, 37b and 37c, reverse cleaning nozzles for discharging compressed air for reverse cleaning into the respective cleaned gas outlet pipes, 38, skirts provided at the lower end portion of the filter tubes 6, 39, an absorbing port of the gas passage 36 to the hopper 8, 40, an ejector composed of the diffuser 34 and an ejector nozzle 41 installed at the gas introducing inlet port 27.

The refractory metal tube of the gas passage 36 is also utilized as a stanchion to support the diffuser 34. A numeral 42 designates an inlet portion of the diffuser 34, and 43, an absorbing port for absorbing the dust laden gas from the hopper 8 through the gas passage 36. It is possible to utilize filter tubes for a portion of the gas passage 36 which passes through the cleaned gas chambers. On the inner wall of the pressure vessel 5, a thermal insulator is actually lined. However, the thermal insulator is not shown in FIG. 6.

In the filter apparatus of FIG. 6, a middle portion of the ejector nozzle 41 attached to the inlet port 27, is separated and has a fitting structure, so that a shift by thermal expansion difference of the refractory metal tube constituting the gas passage 36 is absorbed. Furthermore, the dust laden gas flows downwardly from the gas inlet port 27. The velocity of the dust laden gas is increased at the inlet portion 42 of the diffuser 34 by the ejector nozzle 41, thereby forming a low static pressure at the inlet portion 42. The dust laden gas in the hopper 8 is absorbed from the absorbing port 43 provided at the entry portion 42 of the diffuser 34, through the gas passage 36. The static pressure gradually increases in the diffuser 34. The dust laden gas flows into the gas inlet chamber 33 with the static pressure for instance, 1000 mmAq higher than the static pressure thereof at the inlet portion 42 of the diffuser.

In the gas inlet chamber 33, there causes inevitably a static pressure distribution having a variation of about 70 mmAq as the maximum value. Therefore, the velocities of the dust laden gas flowing into the respective filter tubes 6 are provided with a variation to some degree. Since the static pressure and the flow rate of the dust laden gas flowing into the gas introducing port 27 constantly vary, the static pressure and the velocity vector of gas in the gas inlet chamber 33 change accordingly, and the flow rates of gas flowing into the respective filter tubes 6 also change.

The dust laden gas distributed to the respective filter tubes 6, is filtered on the inner wall surface of the filter tubes 6, while flowing down in the filter tubes 6, and is converted into the cleaned gas flowing into the cleaned gas chambers 4a, 4b and 4c. The cleaned gas of the cleaned gas chambers 4a, 4b and 4c flow out to the cleaned gas outlet pipes 35a, 35b and 35c, and is transmitted to a downstream system from the cleaned gas outlet 30.

Since the cleaned gas oozes out to the outer portion of the filter tubes 6 while flowing down the filter tubes 6, the down flow velocity of the dust laden gas flowing in the filter tubes 6 become gradually smaller as the dust laden gas is flowing down to the bottom portion of the filter tubes 6, and flows into the hopper 8 from the bottom of the skirts 38 attached at the bottom of the filter tubes 6 with velocities having variations with the respective filter tubes.

When the static pressure distribution of the gas in the gas inlet chamber 33 is uniform and there is no variation among each pressure loss of the respective filter tubes, the dust laden gas flows into the hopper 8 with almost the same velocity at the bottom of the respective skirts 38. Actually there is a variation of the velocity. The reason why the skirts 38 are provided, is because the dust falling down from the bottom ends of the filter tubes 6 is not to float up to the absorbing ports 39 of the gas passages 36. It is preferable to elongate the length of the skirts 38 in a range wherein the dusts accumulated on the hopper 8 does not float up.

Considering the pulsation or secondary flow of gas in the hopper 8, the vertical distance from the bottom ends of the skirts 38 to the absorbing ports 39 of the gas passages 36, is preferably not less than 100 mm, more preferably 200 mm. The dust laden gas absorbed by the absorbing ports 39 is recirculated to the gas inlet chamber 33 by flowing into the gas passages 36 from the absorbing port 43 through the diffuser 34.

When a difference of the static pressure of 300 to 1000 mmAq is provided between the outlet portion and the inlet portion of the diffuser 34, about 7 to 15% of recirculation of the dust laden gas introduced into the filter apparatus becomes possible and the downward flow of the dust laden gas can be provided at the bottom ends of all the filter tubes.

When the dust is accumulated on the inner surface of the filter tubes 6 with the start of the introduction of the flue gas into the filter apparatus, the filtering pressure differences between the pressure of the gas inlet chamber 33 and the cleaned gas chambers 4a, 4b and 4c begin to gradually increase. The filtering pressure difference can be maintained at not higher than a predetermined value, by performing the reverse cleaning of the apparatus normally at an interval of a constant time.

The reverse cleaning of the filter tubes 6 is performed by opening and closing quick operating valves (not shown), thereby successively discharging compressed air from the reverse cleaning nozzles 37a, 37b and 37c. By this discharge the pressures in the cleaned gas chambers 4a, 4b and 4c corresponding to the reverse cleaning nozzles, are increased higher than the pressure on the side of the dust laden gas, the reverse cleaning gas which is a mixture of compressed gas and cleaned gas, reversely flows from the outer side to the inner side of the filter tubes 6, and the dust trapped and accumulated on the filter tubes is removed.

The valve opening time of these valves (time required from a fully-closed state to a fully-open state and to the fully-closed state) is normally determined to be 0.1 to 0.5 second. The time required from the fully-closed state to the fully-open state and a holding time at the fully-open state are particularly important to make the reverse cleaning effective. When the time required from the fully-closed state to the fully-open state is too long, a difference between the pressure outside of the filter tubes 6 and the pressure inside of the filter tubes 6 (hereinafter, reverse cleaning pressure difference) can not sufficiently be increased. When the holding time in the fully-open state is too short, the rise of the reverse cleaning pressure difference becomes insufficient and regenerating of the filter tubes 6 of the filter apparatus 4 becomes incomplete.

When the regenerating of the filter tubes 6 by the reverse cleaning is incomplete, the filtering pressure difference tends to gradually increase and the filter capacity becomes unstable. As the condition of the reverse cleaning, there is an optimum valve opening time which is determined by the type and the size of valve, the pressure of compressed air, the diameters of pipings of compressed air, an effective filtration area of the filter tubes 6 which are subjected to the reverse cleaning, the dead volume outside the filter tube 6 (for instance, the volume of the cleaned gas chamber 4c) or the like.

The reverse cleaning in a steady state operation may be performed at a constant interval (for instance, an interval of 15 minutes), in the order of the cleaned gas chambers 4a, 4b and 4c, intermittently at an interval of not more than 60 seconds, or the cleaned gas chambers 4a, 4b and 4c may be reversely-cleaned successively at an interval of constant time (for instance, 5 minutes).

Figure 7:
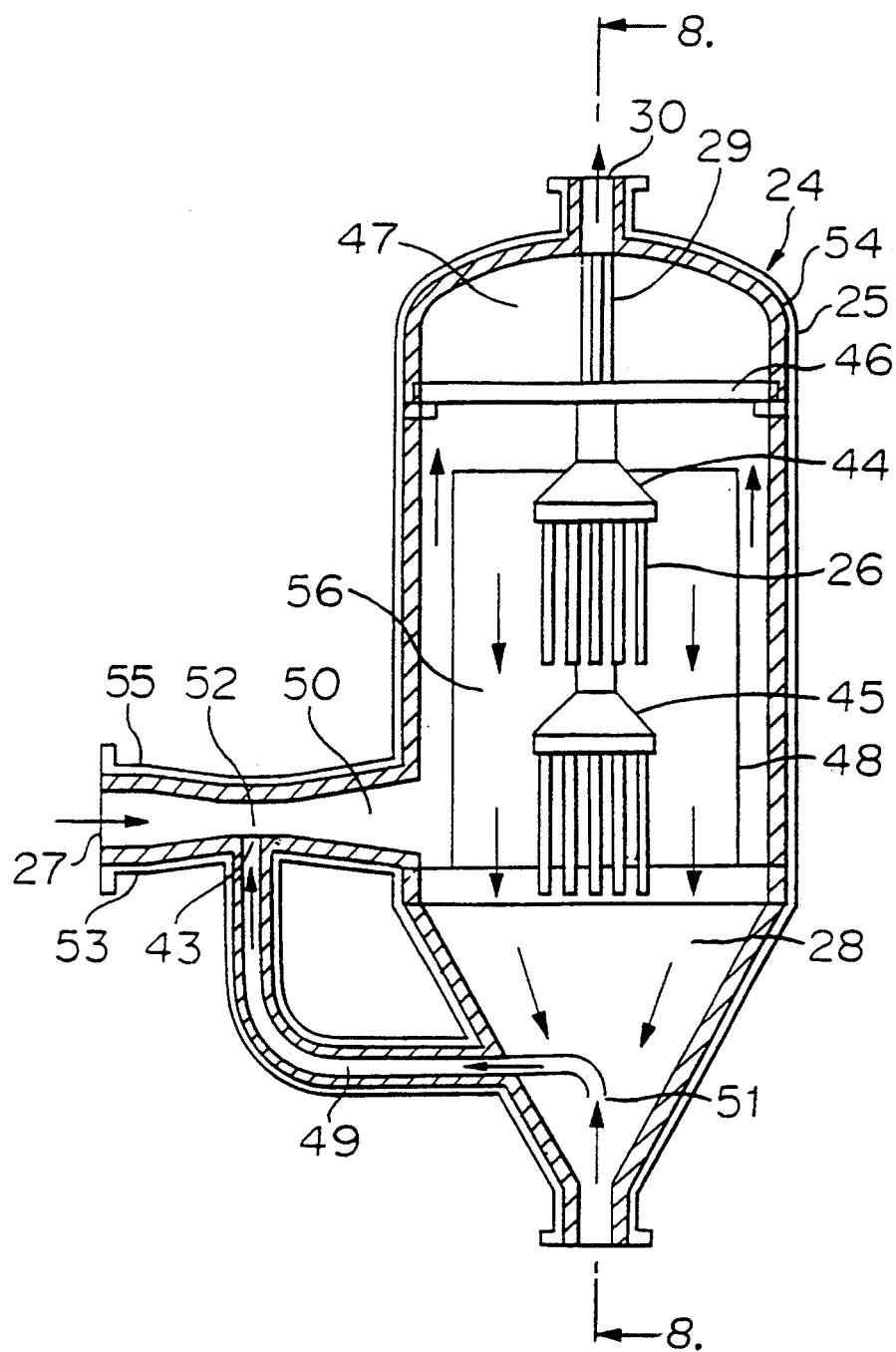
FIG. 7 is a longitudinal sectional diagram showing another example of a filter apparatus for hot gas according to the present invention.
Figure 8:
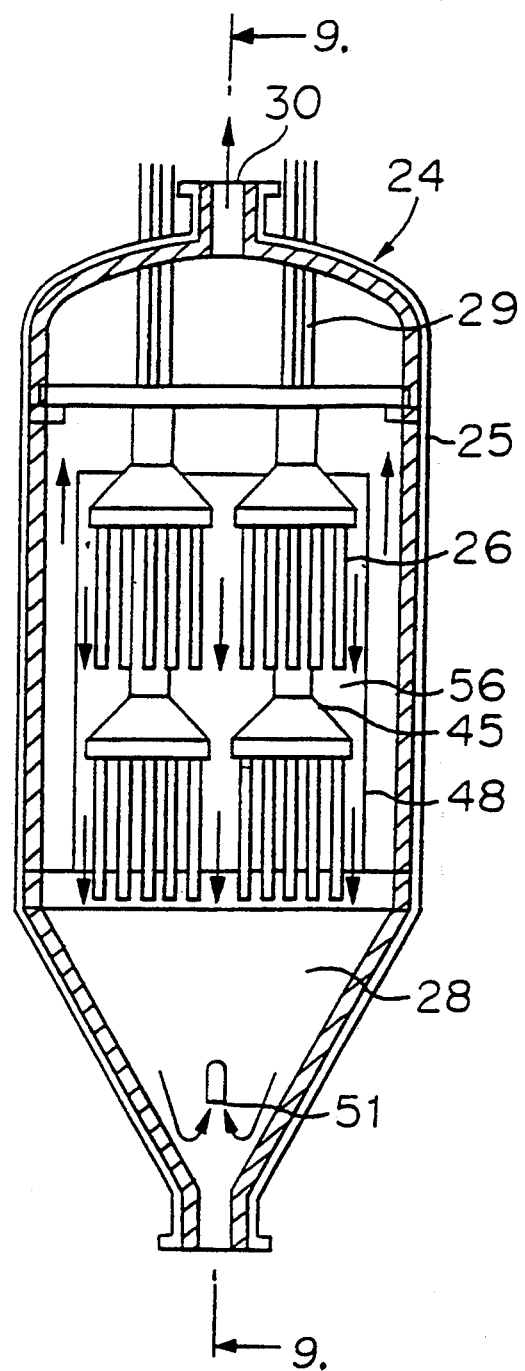
FIG. 8 is a sectional diagram taken along a line A—A of FIG. 7.

FIG. 7 is a longitudinal sectional diagram showing an example wherein the invented filter apparatus for hot gas is applied to a candle type filter apparatus of a so-called Tiered type. FIG. 8 is a sectional diagram taken along a line A—A of FIG. 7, and FIG. 7, a sectional diagram taken along a line B—B of FIG. 8.

In FIG. 7, a reference numeral 24 designates a candle type filter apparatus, 27, a gas introducing port, 30, a cleaned gas outlet, 25, a pressure vessel, 26, filter tubes, each of whose one end is closed, 44, cleaned gas headers, 45, filtration units having ejectors (not shown) for reverse cleaning inside thereof, wherein a plurality of filter tubes 26 are attached to the bottom side of the cleaned gas headers 44 in approximately vertical direction, 46, a tube sheet provided inside of the pressure vessel 25, which hangs the filtration units 45 and partitions the space for the dust laden gas from a space for cleaned gas 47, and 54, a thermal insulator attached to the inside of the pressure vessel 25.

A numeral 29 designates reverse cleaning nozzles inserted into the respective filtration units, 43, an absorbing port which is open to an inlet portion 52 of a diffuser which absorbs dust laden gas from a gas passage 49, 48, a guide sleeve which makes the flow direction of the dust laden gas flowing from a gas introducing port 27 into a downward flow along the filter tubes 26, 28, a hopper, 50, a diffuser, 51, an absorbing port of the gas passage 49 which is open to the hopper 28, 52, an inlet portion of the diffuser 50, 53, a throat provided upstream of the inlet portion 52 of the diffuser 50, 55, an ejector composed of the diffuser 50 and the throat 53, and 56, a filter chamber surrounded by the guide sleeve 48.

In FIGS. 7 and 8, the dust laden gas flows in the filter apparatus 24 from the gas introducing port 27, is turned into the downward flow at the upper portion thereof by the guide sleeve 48 as shown by the arrow mark, flows in the upper portion of the top filtration unit 45 and enters the filter chamber 56. The dust laden gas flows down along the respective filter tubes 26 of the top two sets of the filtration units 45, and reaches the hopper 28. A portion of the dust laden gas is recirculated from the absorbing port 51 to the inlet portion 52 of diffuser through the gas passage 49, and is transmitted to the upper portion of the filter chamber 56 along with the dust laden gas introduced into the filter apparatus 24.

By recirculating the dust laden gas from the hopper to the upstream side of the filter apparatus as above, a horizontal gas flow in the vicinity of the filter tubes 26 of the filtration units 45 is restrained, and the downward gas flow can be provided even in the vicinity about the lower ends of the filter tubes 26 of the bottom filtration units 45 wherein the downward flow velocity of gas in the space on the side of the dust laden gas, is minimized.

On the other hand, the cleaned gas filtrated by the filter tubes 26 is collected into the cleaned gas space 47 through the cleaned gas header 44 by flowing up inside the filter tubes 26, and is transmitted to a downstream system from the cleaned gas outlet 30.

The reverse cleaning is performed by elevating the gas pressure in the cleaned gas header 44 higher than the pressure in the space on the side of the dust laden gas by discharging compressed air from the reverse cleaning nozzles 29 at every filtration unit 45, and by reversely flowing the reverse cleaning gas across the wall of the filter tubes 26.

As in the case of the tube type filter apparatus, the discharge of compressed air from the reverse cleaning nozzles 29, is performed by operating valves (not shown) with the valve opening time (time required from a fully-closed state to a fully-open state, and to the fully-closed state) of 0.1 to 0.5 second. The dust removed from the top filtration units 45 by the reverse cleaning, move downwardly on the gas flow without stagnating in the upper space. Although a portion thereof is trapped by the bottom filtration units 45, the most of them drop into the hopper 28.

When one of the filtration units 45, at the lefthand side or at the righthand side thereof, shown in FIG. 8 is reverse-cleaned, the reverse cleaning gas is discharged from the filtration units, the flow of the dust laden gas in the filter chamber 56 and the hopper 28 is instantaneously disordered. However, since the dust laden gas is always blown drawn from the absorbing port 51, the flow of the dust laden gas recovers to the original state.

Figure 9:
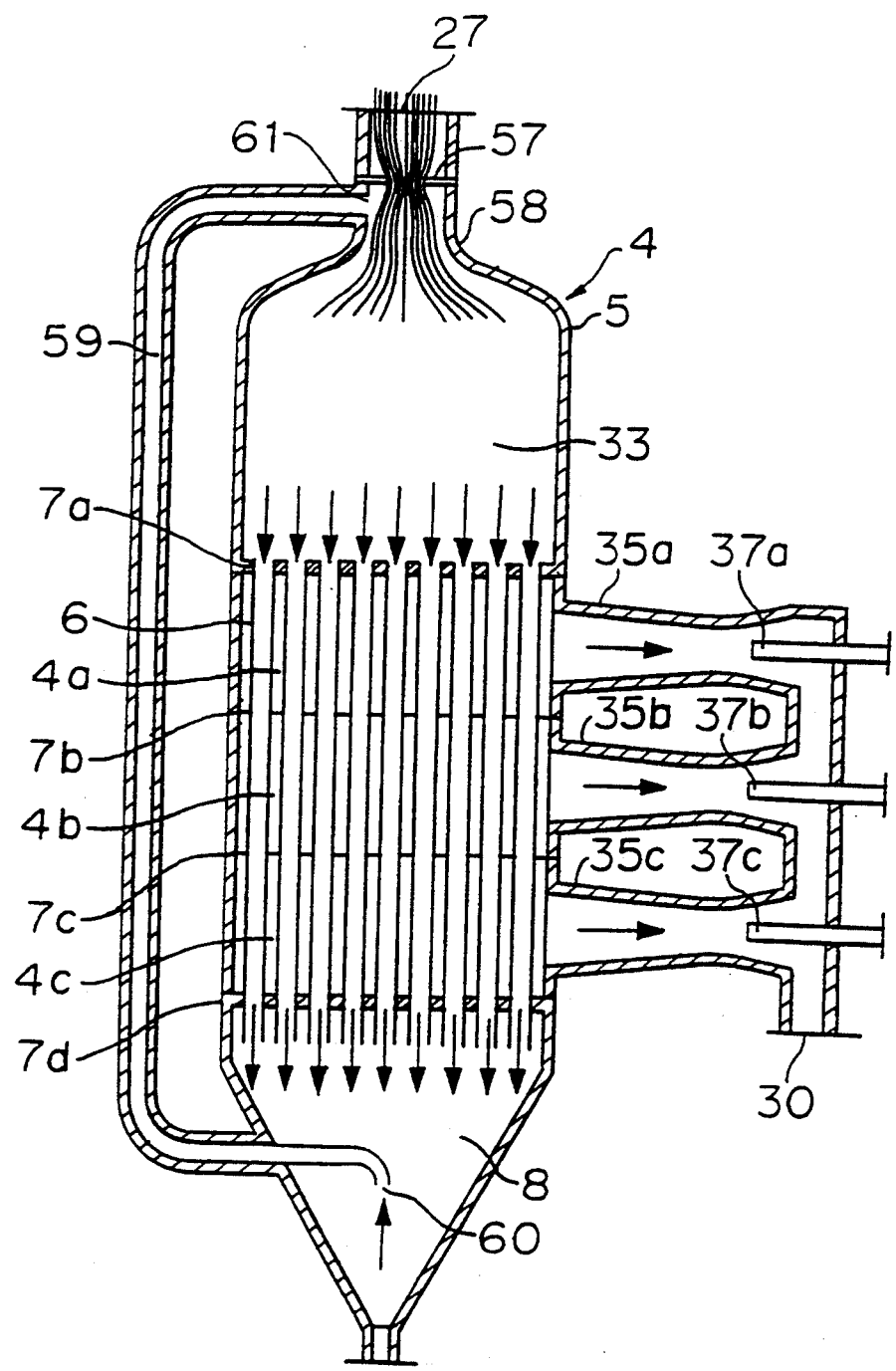
FIG. 9 is a longitudinal sectional diagram showing another embodiment of a filter apparatus for hot gas according to the present invention.

FIG. 9 designates a longitudinal sectional diagram of another embodiment of a tube type filter apparatus of this invention, wherein a numeral 57 designates an orifice, 58, a rounded portion, 59, a gas passage, 60 an absorbing port and 61 an absorbing inlet. The orifice 57 and the rounded portion 58 are provided at the gas introducing port 27, the absorbing inlet 61 is open at a little distance downstream from the orifice 57. The function of the diffuser is achieved by the orifice and the rounded portion 58. Various constructions can be considered as other design variations in the scope of this invention, such as forming an ejector at the space around the guide sleeve.

Figure 10:
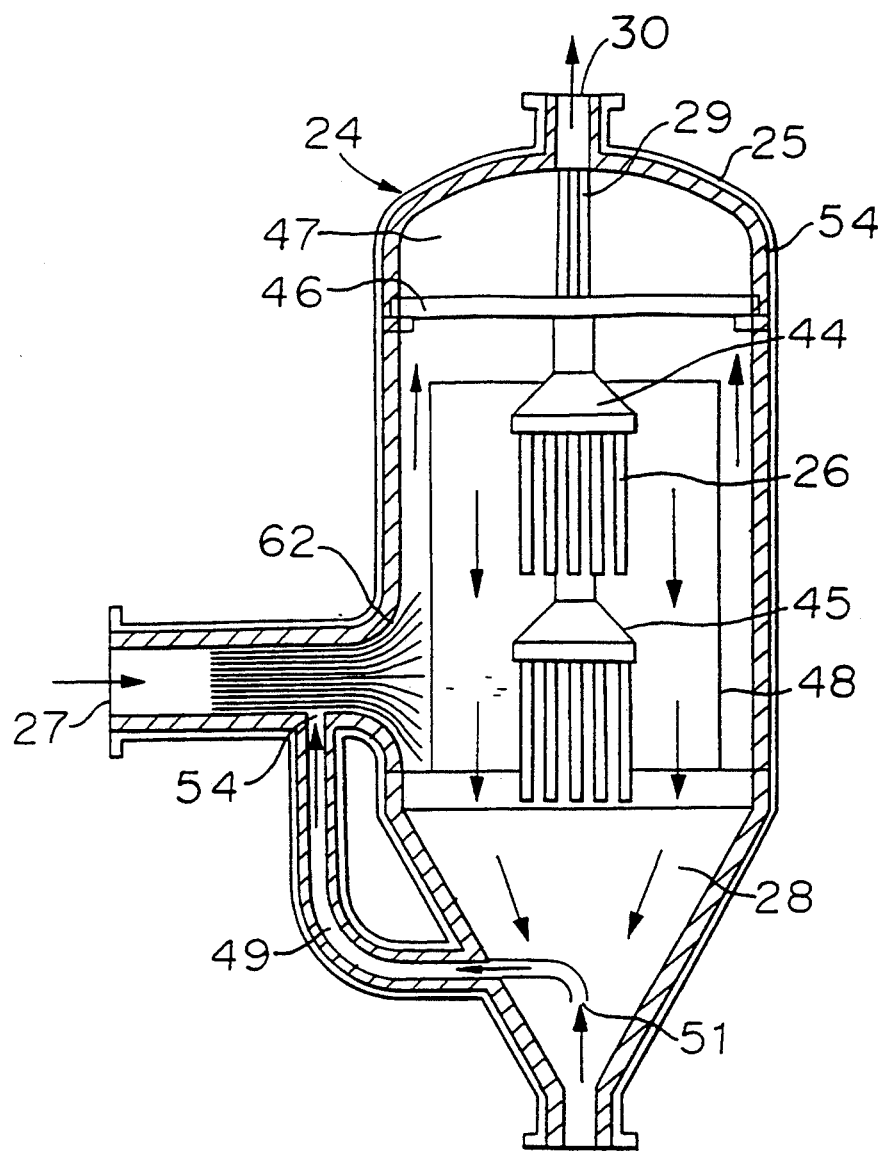
FIG. 10 is a longitudinal sectional diagram showing another embodiment of a filter apparatus for hot gas according to the present invention.

FIG. 10 is a longitudinal sectional diagram of another embodiment of a candle type filter apparatus of this invention, wherein a numeral 62 designates a rounded portion provided in the gas introducing port 27. In this case, even if an orifice is not provided, the function of the diffuser can be achieved only by the rounded portion.

TEST EXAMPLE

An example of a result of a test will be introduced in cases wherein the invented filter apparatus is applied and not applied to the tube type filter apparatus having the top, middle, and bottom cleaned gas chambers connected to a pressurized fluidized bed boiler.

1) In case of not employing the invented filter apparatus (the filter of FIG. 6, without the recirculating means of the dust laden gas):

With the start of the increase of boiler load, the increasing rate of the filtering pressure difference (an increasing rate of the filtering pressure difference per unit time) increases seven times as much as that before the increase of the boiler load, the oxygen concentration rapidly decreases, the dust containing the unburnt component are generated in a large amount, the flying-over thereof takes place (presumably) and the load of boiler becomes 75% after 5 minutes.

After further 1 minute has elapsed, the temperature of the bottom cleaned gas chamber 4c which has been the same with those in the other cleaned gas chambers, rapidly increases compared with those in the other cleaned gas chamber, and after further 3 minutes, the temperature of the bottom cleaned gas chamber 4c becomes higher than those in the other cleaned gas chamber by 40° C. and begins to decrease. It is determined from the former experience that the burning of dust containing the unburnt component accumulated on the inner surface of the filter tubes in the bottom cleaned gas chamber, takes place.

Instantly thereafter, the filtering pressure difference rapidly decreases and the emission of dark smoke is recognized at a chimney on the downstream side. The operation of the boiler is at once stopped and the inside of the filter apparatus is checked. A portion of one of the bottom filter tubes (made of cordierite ceramic, the outer diameter is 17 cm, the inner diameter, 14 cm and the length, 3 m) is chipped off at about 70 cm from the bottom, and a great number of broken pieces of the filter tube are found. It is analyzed that the destruction of the filter tube is caused by the burning of the unburnt component in the dust from the appearance of the cracks and calculations of thermal stress.

2) In case of employing the invented filter apparatus:

10% of boiler flue gas flowing into the gas introducing port 21 of the filter apparatus 4 having the construction of FIG. 6, is recirculated from the hopper 8 to the gas inlet chamber 33. The boiler load is increased little by little, and the initial light oil combustion is switched to coal combustion, the temperature inside of the filter tubes 6 in the bottom cleaned gas chamber 4c, is kept stable. Even when the boiler load is increased to 75%, the filtering pressure difference and the temperature in the bottom cleaned gas chamber 4c do not increase compared with those in the other cleaned gas chambers. Thereafter, the boiler load is increased from 75% to 100% and the boiler is operated for a total of about 48 hours and is stopped.

The bottom cleaned gas chamber 4c of the filter apparatus is opened and checked. As a result, no abnormality is observed in the filter tubes 6. Furthermore, no indication is recognized wherein the dust containing a large amount of unburnt component accumulates on any portions of the filter tubes 6 in the filter apparatus 4.

When the filtering method of boiler flue gas according to the present invention, is applied to a power generation plant or the like employing a pressurized fluidized bed combustion boiler wherein coal is utilized as fuel, even if a large amount of dust containing unburnt component such as soot is entrained in the flue gas, the frequent reverse cleaning is started at once and continues for a period of time wherein the unburnt component continues generating. Therefore, the dust containing the unburnt component does not thickly accumulate on the surface of the ceramic filters, and the phenomenon wherein the ceramic filters integrated in the filter apparatus are thermally damaged by the flying-over and burning of the unburnt component, can be prevented.

Furthermore, by employing the invented filter apparatus wherein the diffuser is provided at the gas introducing portion thereof, utilizing the pressure difference obtained by the diffuser for recirculating the dust laden gas from the hopper to the gas introducing portion, the recirculation of the dust laden gas to the gas introducing portion of the apparatus which has not been easy, can easily be performed by effectively utilizing a very small portion of energy of the hot dust laden gas introduced into the apparatus. Even when the laden gas containing the unburnt component is introduced in a large amount, the tendency wherein the dust is are accumulated partially on some portions of the ceramic filters, is restrained by the blow-down effect, and the rate of the dust accumulation on the filtration surface of the ceramic filters can be restrained. Therefore, even if the dust containing the unburnt component is emitted in the flue gas and introduced to the apparatus in a large amount, the phenomenon wherein the ceramic filters are thermally damaged by the burning of the dust containing the unburnt component, is avoided since the quantity of the dust containing the unburnt component accumulating on the ceramic filter is kept small. Accordingly, the filter apparatus can be operated stably.

Furthermore, in the filter apparatus for hot gas performing the recirculation of the dust laden gas according to the present invention, wherein the frequent reverse cleaning is started at once by detecting the flying-over of the dust containing the unburnt component, the stable operation of the filter apparatus can be performed even under a severe operating condition wherein the unburnt component flies over in a large amount.

In the power generating technology utilizing a pressurized fluidized bed combustion boiler or by a coal gas gasifier, power can efficiently be generated by employing abundantly produced coal and almost no $SO_x$ or $NO_x$ is contained in the emitted flue gas. Therefore, the full-scale reduction to practice of these technologies which currently are in the introductory stage, can considerably be accelerated. Therefore the influence of the filtering method of flue gas of a boiler and the filter apparatus for hot gas according to the present invention on the future energy industry, is great.

What is claimed is:

1. A filtering method of flue gas of a boiler employing a filter apparatus integrated with ceramic filters and provided with control means for regenerating the ceramic filters by reverse cleaning, the method comprising the steps of:

detecting directly or indirectly, by use of a detecting means, an unburnt component and flue gas accompanying said unburnt component introduced into the filter apparatus when combustion in the boiler is incomplete;

opening and closing valves of a compressed gas by a signal transmitted from the control means when flying-over of the unburnt component to the filter apparatus is detected; and performing a reverse cleaning by blowing the compressed gas into spaces of a cleaned gas side of said filter apparatus, wherein said reverse cleaning is frequently performed in intervals shorter than four minutes and continues until the flying-over of the unburnt component decreases to a small quantity.

2. The filtering method of flue gas of a boiler according to claim 1, wherein the detecting means for detecting the unburnt component detects a dust concentration of the flue gas.

3. The filtering method of flue gas of a boiler according to claim 2, wherein the detecting means for detecting the unburnt component is an optical sensor.

4. The filtering method of flue gas of a boiler according to claim 1, wherein the detecting means for detecting the unburnt component detects increase of a pressure difference of the ceramic filters or increase of an increasing rate of the pressure difference of the ceramic filters.

5. The filtering method of flue gas of a boiler according to claim 1, wherein the detecting means for detecting the unburnt component detects increase of a temperature difference between positions of respective ceramic filters or increase of a temperature difference between cleaned gas chambers partitioned by tube sheets.

6. The filtering method of flue gas of a boiler according to claim 1, wherein the detecting means for detecting the unburnt component detects decrease of oxygen concentration of the flue gas or increase of absolute value of a decreasing rate of the oxygen concentration.

7. The filtering method of flue gas of a boiler according to claim 1, wherein the detecting means for detecting the unburnt component detects increase of carbon monoxide concentration of the flue gas or increase of increasing rate of the carbon monoxide concentration.

8. The filtering method of flue gas of a boiler according to claim 1, wherein the detecting means for detecting the unburnt component detects a load increase instruction of the boiler load.

9. The filtering method of flue gas of a boiler according to claim 1, wherein the detecting means for detecting the unburnt component detects a purge instruction of a fuel charge manifold of the boiler and the reverse cleaning is temporarily performed by compressed nitrogen gas.

10. The filtering method of flue gas of a boiler according claim 1, wherein the flue gas is a pressurized flue gas emitted from a coal-fired pressurized fluidized bed combustion boiler.

11. The filtering method of flue gas of a boiler according to claim 10, wherein the flue gas is emitted from a bubbling bed type pressurized fluidized bed combustion boiler.

12. The filtering method of flue gas of a boiler according to claim 1, wherein blowing down for extracting dust laden gas from a hopper provided at a lower portion of a filter vessel is carried out in parallel with the frequent reverse cleaning.

13. A filter apparatus for hot gas comprising:
ceramic filters incorporated in a vessel;
a reverse cleaning means for regenerating the ceramic filters by removing dust trapped by the ceramic filters;
a hopper provided at a lower portion of the vessel for collecting the removed dust;
a diffuser provided in the vicinity of a gas introducing port of the vessel or at a dust laden gas introducing pipe; and
one or more gas passages for communicating an inlet of the diffuser with the hopper;
wherein the diffuser converts a dynamic pressure of the dust laden gas to a static pressure and recirculates the dust laden gas to the inlet of the diffuser from the hopper and through said one or more gas passages by utilizing said static pressure.

14. The filter apparatus for hot gas according to claim 13, wheerein the diffuser is a portion of an ejector having a nozzle at said gas introducing port.

15. The filter apparatus for hot gas according to claim 13, wherein the vessel is a pressure vessel and the one or more gas passages are provided inside the pressure vessel.

16. The filter apparatus for hot gas according to claim 13, wherein the ceramic filters comprise a plurality of filter tubes which are open at both ends thereof, an inner portion of the vessel is partitioned by a plurality of approximately horizontal tube sheets, a gas inlet chamber is provided above the top tube sheet, the plurality of filter tubes are held by the tube sheets at the respective ends thereof and the dust laden gas flows from top to bottom through inside of the plurality of filter tubes.

17. The filter apparatus for hot gas according to claim 13, wherein the ceramic filters comprise a plurality of filter tubes each of which is closed at one end thereof, one or more filtration units are provided in the vessel in which a plurality of filter tubes are installed at the top sides or the bottom sides of cleaned gas headers in approximately vertical direction, and the dust laden gas is filtered while flowing down from the top portions of the filtration units along the external sides of the filter tubes.

18. The filter apparatus for hot gas according to claim 17, wherein the plurality of filtration units are provided in the vessel in the horizontal direction.

19. A filter apparatus for hot gas, comprising:
ceramic filters incorporated in a vessel;
reverse cleaning means for regenerating the ceramic filters by reverse cleaning;
at least one detecting means for directly or indirectly detecting flue gas accompanied by unburnt component and a flying-over of the unburnt component to the filter apparatus;
control means including means for opening and closing valves of a compressed gas in response to a signal transmitted from the control means when the flying-over of the unburnt component is detected to thereby start a frequent reverse cleaning in which compressed gas is blown into a space on a cleaned gas side of the filter apparatus, wherein the frequent reverse cleaning is continued until the flying-over of the unburnt component decreases to a small quantity.

* * * * *